US008881160B2

(12) United States Patent
Ozaki et al.

(10) Patent No.: US 8,881,160 B2
(45) Date of Patent: Nov. 4, 2014

(54) WORKFLOW EXECUTION METHOD FOR ACQUIRING AN ORDER OF EXECUTING PROCESSING ON AN INPUT DOCUMENT, INFORMATION PROCESSING APPARATUS FOR CONDUCTING THE METHOD, AND WORKFLOW MANAGEMENT SYSTEM INCLUDING THE INFORMATION PROCESSING APPARATUS

(75) Inventors: Hiroki Ozaki, Kanagawa (JP); Masateru Kumagai, Kanagawa (JP); Shinsuke Yanazume, Kanagawa (JP); Hiroshi Baba, Kanagawa (JP); Shoh Nagamine, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 378 days.

(21) Appl. No.: 13/278,211

(22) Filed: Oct. 21, 2011

(65) Prior Publication Data
US 2012/0117570 A1 May 10, 2012

(30) Foreign Application Priority Data

Nov. 5, 2010 (JP) ................................ 2010-248014

(51) Int. Cl.
| G06F 9/46 | (2006.01) |
| G06Q 10/06 | (2012.01) |
| H04N 1/00 | (2006.01) |
| G06F 3/12 | (2006.01) |

(52) U.S. Cl.
CPC ............... *G06Q 10/06* (2013.01); *G06F 3/1275* (2013.01); *G06F 3/1273* (2013.01); *G06F 3/1285* (2013.01); *H04N 1/00* (2013.01); *G06F 3/1211* (2013.01); *G06F 3/1218* (2013.01)
USPC ........................................................ 718/102

(58) Field of Classification Search
None
See application file for complete search history.

(56) References Cited

U.S. PATENT DOCUMENTS 8,368,931 B2 * 2/2013 Tamura ......................... 358/1.15
2002/0138543 A1 * 9/2002 Teng et al. ..................... 709/102

(Continued)

FOREIGN PATENT DOCUMENTS

| JP | 2003-030391 | 1/2003 |
| JP | 2005167988 A | 6/2005 |

(Continued)

OTHER PUBLICATIONS

Abstract of JP 2007-166426 published Jun. 28, 2007.

(Continued)

*Primary Examiner* — Van Nguyen
(74) *Attorney, Agent, or Firm* — Harness, Dickey & Pierce, P.L.C.

(57) ABSTRACT

An information processing apparatus sequentially executing one or more processes of a workflow on an input document includes: a workflow-information storage unit storing workflow information; a result storage unit storing a process result; a workflow control unit receiving workflow identification information for identifying the workflow and acquiring workflow information from the workflow-information storage unit on the basis of the workflow identification information; and a result acquiring unit acquiring the process result from the result storage unit based on the result identification information when the workflow information acquired by the workflow control unit includes the result identification information. The workflow control unit acquires the process result from the result acquiring unit and transmits the process result to an apparatus that executes a process subsequent to a process corresponding to the process result in the workflow in order to execute the workflow from a process in the middle of the workflow.

20 Claims, 15 Drawing Sheets

(56) References Cited

U.S. PATENT DOCUMENTS

| | | | |
|---|---|---|---|
| 2003/0018683 A1 | 1/2003 | Nara et al. | |
| 2004/0019512 A1* | 1/2004 | Nonaka | 705/8 |
| 2006/0085315 A1* | 4/2006 | Sugano | 705/35 |
| 2008/0229306 A1* | 9/2008 | Omori | 718/100 |
| 2009/0076877 A1* | 3/2009 | Yano et al. | 705/8 |
| 2009/0158281 A1* | 6/2009 | Omori | 718/101 |
| 2010/0123930 A1 | 5/2010 | Tomizawa | |

FOREIGN PATENT DOCUMENTS

| | | |
|---|---|---|
| JP | 2007166426 A | 6/2007 |
| JP | 2010-055256 A | 3/2010 |
| JP | 2010-123124 A | 6/2010 |

OTHER PUBLICATIONS

Abstract of JP 2005-167988 published Jun. 23, 2005.
Japanese Office Action mailed May 7, 2014.

* cited by examiner

FIG.1
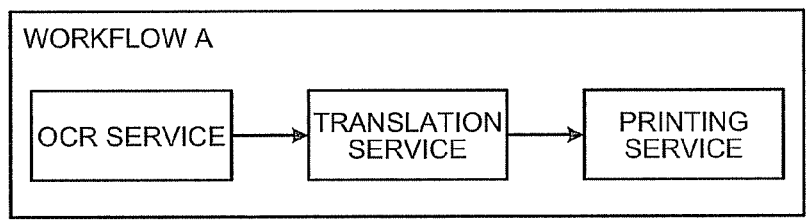
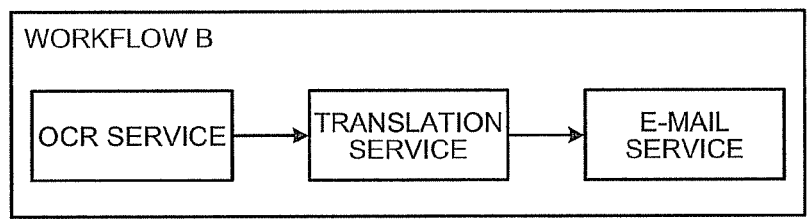
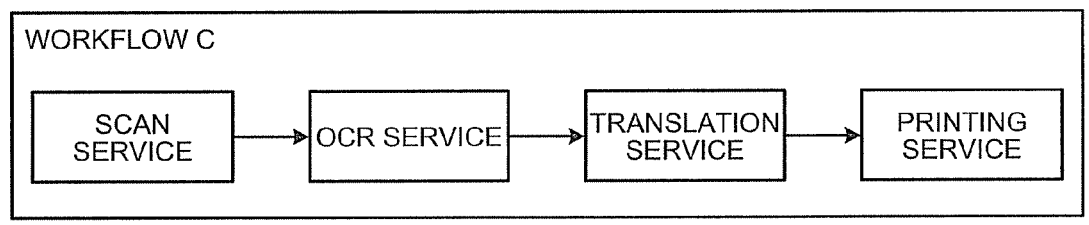
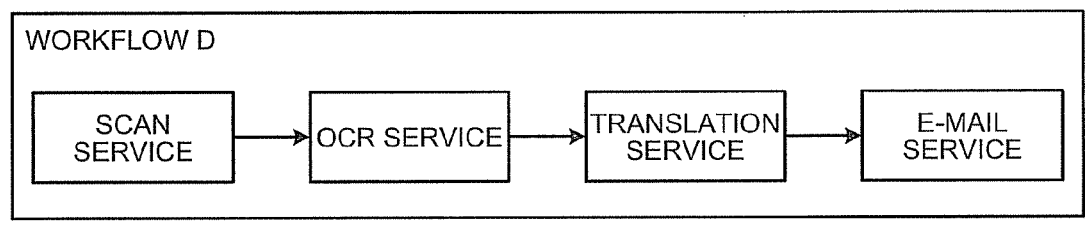

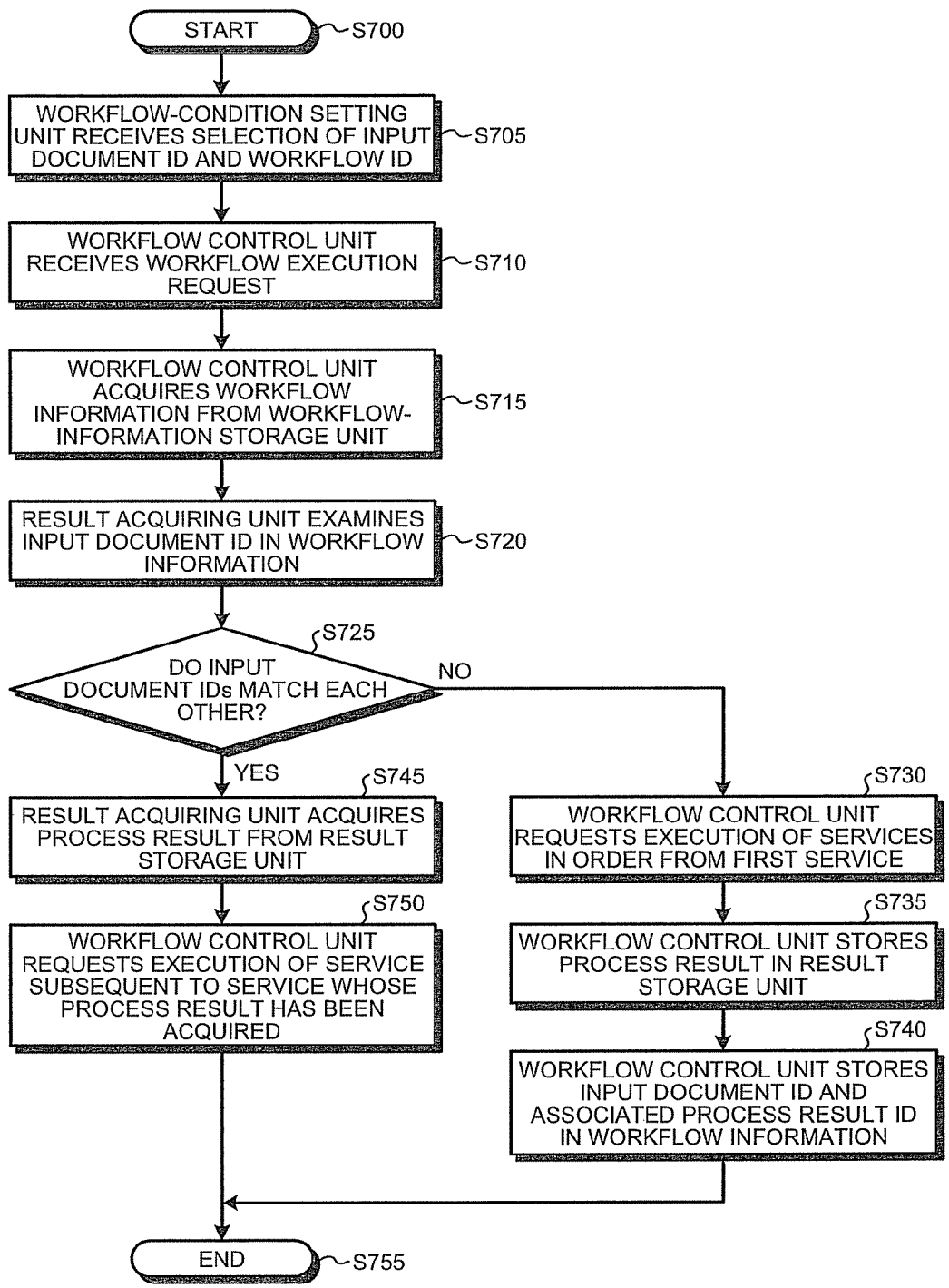

FIG.8A
|  | OCR SERVICE | PRINTING SERVICE |
|---|---|---|
| INPUT DOCUMENT ID | – | – |
| PROCESS RESULT ID | – | – |
FIG.8B
|  | OCR SERVICE | PRINTING SERVICE |
|---|---|---|
| INPUT DOCUMENT ID | DOCUMENT A | – |
| PROCESS RESULT ID | RESULT A | – |
FIG.9A
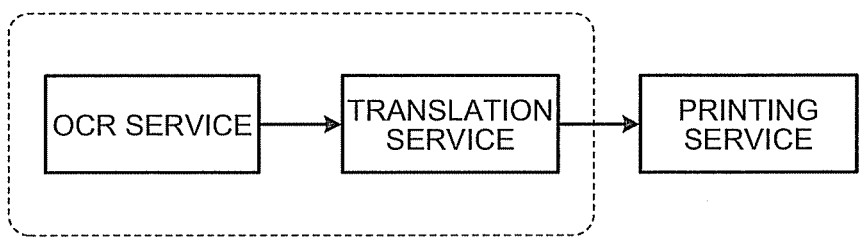
FIG.9B
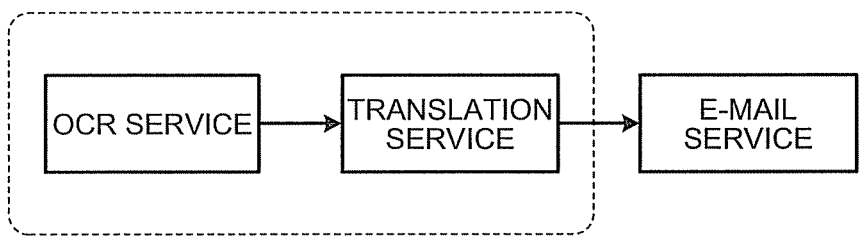

FIG.16A

|  | OCR SERVICE | PRINTING SERVICE |
|---|---|---|
| WORKFLOW ID WITH SAME STORING OBJECT | B | – |
| INPUT DOCUMENT ID | – | – |
| PROCESS RESULT ID | – | – |

FIG.16B

|  | OCR SERVICE | PRINTING SERVICE |
|---|---|---|
| WORKFLOW ID WITH SAME STORING OBJECT | A | – |
| INPUT DOCUMENT ID | – | – |
| PROCESS RESULT ID | – | – |

FIG.16C

|  | OCR SERVICE | PRINTING SERVICE |
|---|---|---|
| WORKFLOW ID WITH SAME STORING OBJECT | B | – |
| INPUT DOCUMENT ID | DOCUMENT A | – |
| PROCESS RESULT ID | LOCATION A | – |

WORKFLOW EXECUTION METHOD FOR ACQUIRING AN ORDER OF EXECUTING PROCESSING ON AN INPUT DOCUMENT, INFORMATION PROCESSING APPARATUS FOR CONDUCTING THE METHOD, AND WORKFLOW MANAGEMENT SYSTEM INCLUDING THE INFORMATION PROCESSING APPARATUS

CROSS-REFERENCE TO RELATED APPLICATIONS

The present application claims priority to and incorporates by reference the entire contents of Japanese Patent Application No. 2010-248014 filed in Japan on Nov. 5, 2010.

BACKGROUND OF THE INVENTION

1. Field of the Invention

The present invention relates to an information processing apparatus that controls execution of services provided by an image forming apparatus or the like in accordance with a service process procedure of a workflow. The present invention also relates to a workflow management system that includes the image forming apparatus and the information processing apparatus, and a workflow execution method performed by the information processing apparatus.

2. Description of the Related Art

In recent years, more and more image forming apparatuses, such as facsimile machines, printers, or MFPs (Multi Function Peripherals), are becoming compatible with network and functions equipped by the image forming apparatuses are increasingly provided as services via the network. In addition, a plurality of server apparatuses installed with various contents are distributed over the network and cloud computing that uses various services provided by the servers is being promoted.

The above structure formed of a plurality of image forming apparatuses and server apparatuses connected to the network functions as a service providing system that provides various services. The service providing system can not only provide one service by one of the image forming apparatuses and the server apparatuses, but also provide a plurality of services by making an execution sequence, as a workflow, of any services that are provided by the apparatuses and the devices via the network and by executing the services in order of the sequence set as the workflow so that the apparatuses and the devices can efficiently be used.

For example, in order to allow an MFP that belongs to a user to display functions provided by a service provider on a network as if the MFP has these functions and to let the user select and execute the functions, there is a proposed system in which the image forming apparatus in a user environment is connected, via the Internet, to a provider environment for providing various services (see Japanese Patent Application Laid-open No. 2005-167988). To realize the above system, the system mainly includes an information acquiring unit that acquires information on processes of various services connected to the network and a control unit to control the processes.

Furthermore, to provide an image forming apparatus, a workflow execution method, and a workflow execution program capable of reducing operational load on users when work items included in a workflow are executed, an image forming apparatus that can set a workflow has been proposed (see Japanese Patent Application Laid-open No. 2007-166426). The image forming apparatus includes a work-item managing unit that registers setting information related to work items for each work item included in the workflow; a display unit that displays a graphic indicating a work item for each work item registered in the work-item managing unit; and a work-item executing unit that executes image processing based on the setting information registered for a work item corresponding to a selected graphic in accordance with selection of the graphic.

In the workflow system using a sequence of a plurality of services, a service execution sequence that a user frequently uses is registered in advance as a workflow so that the same service procedure can be executed by only selecting the registered workflow instead of generating the execution sequence every time the workflow is used. Meanwhile, a user may repeatedly use the same workflow on the same document. In this case, the same processes are repeated from the first service every time the workflow is used. Therefore, there is a problem in that the same usage charge is charged and the same execution time is needed for each use although the result is the same.

For example, there may be a case that a user stores a certain document in an MFP and executes a workflow for performing OCR (Optical Character Recognition), translation, and printing on the stored document, and a different user later executes the same workflow on the same document. For another example, because a document that is once printed is often discarded, there may be a case that the same workflow is repeated when the same document is needed once again. In the above cases, if the services are executed in order from the first service every time the workflow is executed, the three services, i.e., OCR, translation, and printing, are repeated, so that execution time and usage charge are needed.

That is, the conventional apparatuses and systems have the above problems because they cannot store a process result of a service as an intermediate result and cannot execute the workflow from a process in the middle of the workflow.

SUMMARY OF THE INVENTION

It is an object of the present invention to at least partially solve the problems in the conventional technology.

According to an aspect of the present invention, there is provided an information processing apparatus that sequentially executes one or more processes of a workflow on an input document, the information processing apparatus including: a workflow-information storage unit that stores workflow information; a result storage unit that stores a process result; a workflow control unit that receives workflow identification information for identifying the workflow and acquires workflow information from the workflow-information storage unit on the basis of the workflow identification information, the workflow information including process identification information for identifying each of the processes to be executed and an order of execution of the processes, and the workflow information further including result identification information for identifying a process result of any of the processes when the process result is stored in the result storage unit; and a result acquiring unit that acquires the process result from the result storage unit on the basis of the result identification information when the workflow information acquired by the workflow control unit includes the result identification information. The workflow control unit acquires the process result from the result acquiring unit and transmits the process result to an apparatus that executes a process subsequent to a process corresponding to the process result in the workflow in order to execute the workflow from a process in the middle of the workflow.

According to another aspect of the present invention, there is provided a workflow management system including: an information processing apparatus that sequentially executes one or more processes of a workflow on an input document, the information processing apparatus including: a workflow-information storage unit that stores workflow information; a result storage unit that stores a process result; a workflow control unit that receives workflow identification information for identifying the workflow and acquires workflow information from the workflow-information storage unit on the basis of the workflow identification information, the workflow information including process identification information for identifying each of the processes to be executed and an order of execution of the processes, and the workflow information further including result identification information for identifying a process result of any of the processes when the process result is stored in the result storage unit; and a result acquiring unit that acquires the process result from the result storage unit on the basis of the result identification information when the workflow information acquired by the workflow control unit includes the result identification information. The workflow control unit acquires the process result from the result acquiring unit and transmits the process result to an apparatus that executes a process subsequent to a process corresponding to the process result in the workflow in order to execute the workflow from a process in the middle of the workflow; and apparatuses that execute the respective processes.

According to still another aspect of the present invention, there is provided a workflow execution method for sequentially executing one or more processes on an input document, the workflow execution method including: receiving workflow identification information for identifying the workflow; acquiring workflow information from a workflow-information storage unit on the basis of the workflow identification information, the workflow information including process identification information for identifying each of the processes to be executed and an order of execution of the processes, and the workflow information further including result identification information for identifying a process result of any of the processes when the process result is stored in a result storage unit; acquiring the process result from a result storage unit on the basis of the result identification information when the workflow information acquired by a workflow control unit includes the result identification information; transmitting the process result to an apparatus that executes a process subsequent to a process corresponding to the process result in the workflow. The workflow is executed from a process in the middle of the workflow.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 illustrates examples of workflows;

FIG. 7 is a flowchart of processes for executing a workflow;

FIGS. 8A and 8B illustrate examples of workflow information stored in a workflow-information storage unit;

FIGS. 9A and 9B illustrate examples of workflows;

FIGS. 16A to 16C illustrate examples of workflow information stored in the workflow-information storage unit.

DETAILED DESCRIPTION OF THE PREFERRED EMBODIMENTS

A workflow will be explained first, and thereafter, the present invention will be explained. The workflow is a unit, in which several services on a network are combined in order of execution and the combination is handled as one process procedure. FIG. 1 illustrates examples of workflows. In FIG. 1, a workflow A represents a process procedure for executing an OCR service, a translation service, and a printing service in this order, and a workflow B represents a process procedure for executing the OCR service, the translation service, and an e-mail service in this order.

A workflow C represents a process procedure for executing a scanning service, the OCR service, the translation service, and a printing service in this order. A workflow D represents a process procedure for executing the scanning service, the OCR service, the translation service, and the e-mail service in this order.

The services include processing functions that are provided by apparatuses connected to a network and software services that are available over the network. Examples of the processing functions provided by the apparatuses include a scan function (image reading function) and a print function provided by an MFP. Examples of the software services available over the network include an OCR service for recognizing and extracting characters from images, a translation service for translating languages, and an e-mail service for e-mail delivery.

The workflow is stored and registered by a user as workflow information in a storage device included in a workflow management server connected to the network. After the workflow is registered, if the user selects an input document and gives an instruction to execute the workflow, the workflow management server receives the instruction and transmits an execution request to apparatuses that execute processes of corresponding services on the network. The input document is handled as input to an apparatus that firstly receives the execution request and the input document is transmitted to the apparatus together with the execution request.

Figure 2:
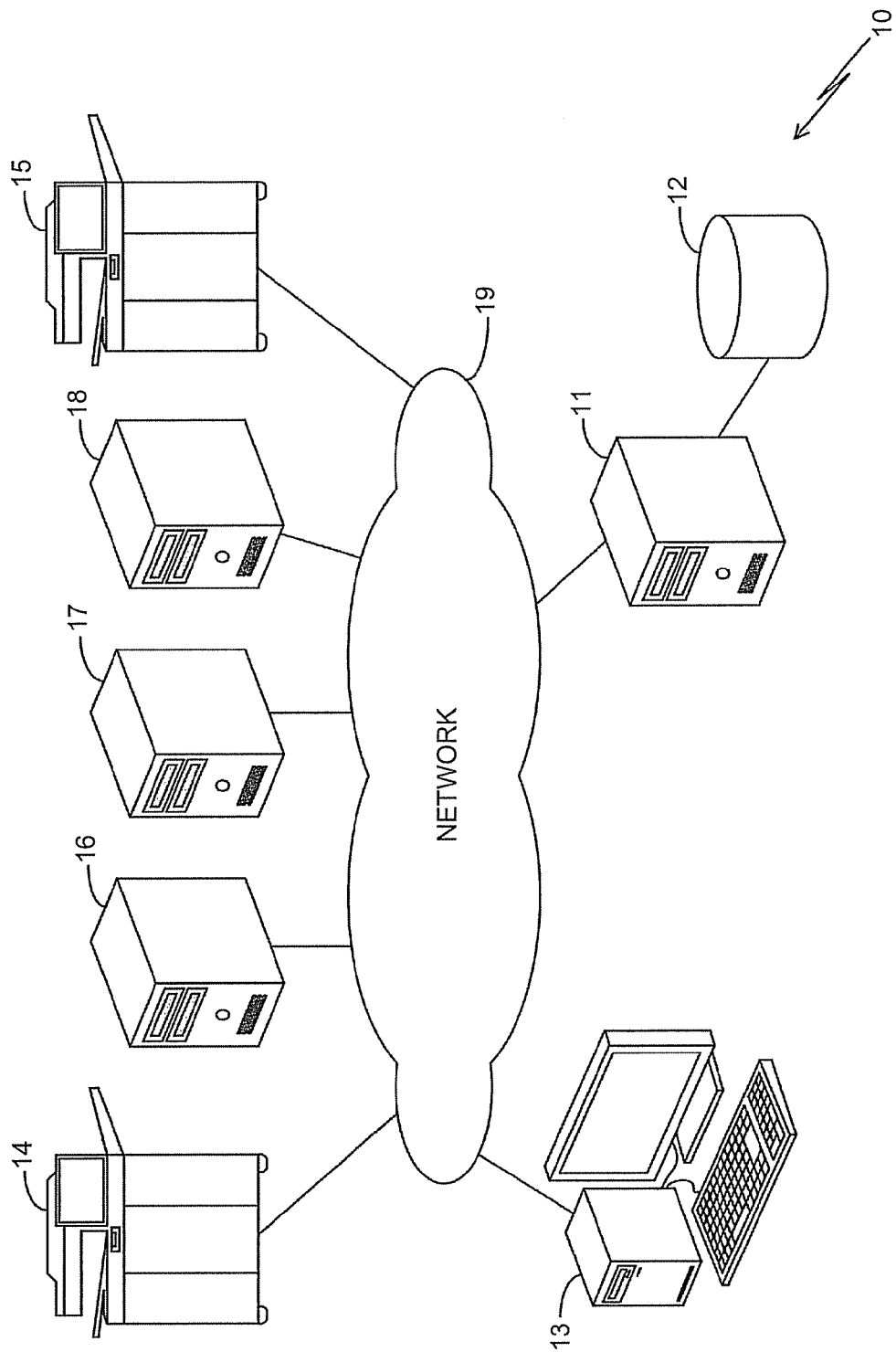
FIG. 2 is a diagram of a configuration example of a workflow management system according to the present invention.

FIG. 2 is a diagram of a configuration example of the workflow management system. A workflow management system 10 includes a workflow management server 11 as described above; a personal computer (PC) 13 used by a user for selecting an input document and giving an instruction to the workflow management server 11; a storage device 12 connected to the workflow management server 11 and used for storing and registering the input document; and MFPs 14, 15 and server apparatuses 16 to 18 that provide services.

Figure 3:
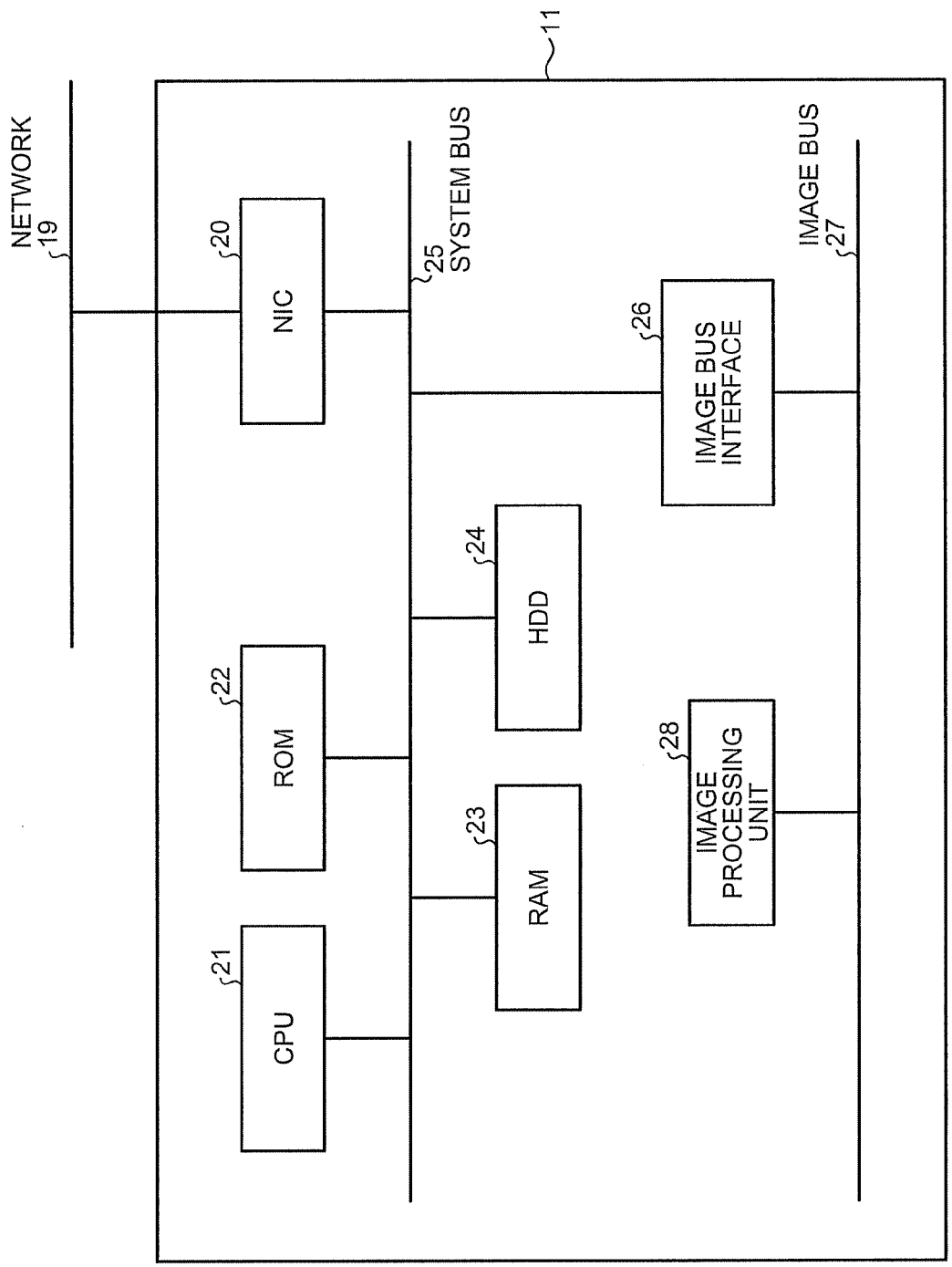
FIG. 3 is a diagram of a hardware configuration example of an information processing apparatus included in the workflow management system.

The workflow management server 11, the PC 13, the MFPs 14 and 15, and the server apparatuses 16 to 18 are connected to one another via a network 19. As illustrated in FIG. 3, the workflow management server 11 or the like includes a network interface (NIC) 20 that enables communication via the network 19. For example, the workflow management server 11 can connect to the network 19 via the NIC 20 and can transmit and receive data to and from other apparatuses, such as the PC 13, the MFPs 14 and 15, and the server apparatuses 16 to 18, connected to the network 19.

The workflow management server 11 or the like includes a central processing unit (CPU) 21 that executes processes; a read only memory (ROM) 22 as a storage device; a random access memory (RAM) 23 as a storage device; and a hard disk drive (HDD) 24 as a storage device. The above units are connected to one another via a system bus 25. The system bus 25 is connected to an image bus 27 via an image bus interface 26 in the workflow management server 11. An image processing unit 28 that executes image processing is connected to the image bus 27.

The ROM 22 stores therein a system boot program. The boot program is a computer program for activating an apparatus. For example, when the apparatus is a PC, the boot program causes an operating system (OS) stored in the HDD 24 to be loaded on a memory and to be activated so that the apparatus becomes ready to operate. The RAM 23 is used as a working memory for running the CPU 21 or a memory for temporarily storing image data. The HDD 24 stores therein system software, such as driver or utility software for operating hardware, document data of an input document, or the like in addition to the OS described above.

The image processing unit 28 included in the workflow management server 11 includes an application specific integrated circuit (ASIC) as an integrated circuit for specific purposes and performs processing, such as binarization for converting a grayscale image into a binary format image or edge detection for detecting boundaries of an object on the basis of a concentration change. Each of the MFPs 14 and 15 further includes a scanner device for providing the scanning service and a printing device for providing the printing service.

The scanner device includes a known light source, known mirrors, known lenses, and a known imaging device, such as a charge coupled device (CCD) or a complementary metal oxide semiconductor (CMOS). If the printing device is an electrophotographic printer, the printing device includes an exposure device that applies image writing light; a photosensitive drum to be irradiated with the writing light; a charging unit that charges the photosensitive drum; a developing unit that develops an image by causing toner to adhere to a latent image that is formed on the surface of the photosensitive drum with the writing light; a transfer unit that transfers the toner image formed by the development onto a sheet; a fixing unit that fixes the transferred toner image to the sheet by applying heat and pressure; a feed unit that feeds sheets; and a discharging unit that discharges the sheet to which the toner image is fixed.

As in the workflow A illustrated in FIG. 1, when a workflow with an execution sequence of the OCR service, the translation service, and the printing service arranged in this order is to be executed, the workflow management server 11 illustrated in FIG. 2 firstly requests the server apparatus 16, which executes the OCR service, to execute an OCR process and transmits an input document to the server apparatus 16. When completing the OCR process, the server apparatus 16 transmits an OCR-process completion notice to the workflow management server 11 together with a result of the OCR process. Upon receiving the OCR-process completion notice, the workflow management server 11 transmits the received result of the OCR process and an execution request for a translation process to the server apparatus 17 that executes the translation service. When completing the translation process, the server apparatus 17 transmits a translation-process completion notice to the workflow management server 11 together with a result of the translation process.

Upon receiving the translation-process completion notice, the workflow management server 11 transmits the received result of the translation process together with an execution request for a printing process to the MFP 15 that executes a printing service. The execution request for the printing process may include print setting information, such as a sheet size, the number of sheets, or information on whether to perform aggregate printing or duplex printing. The MFP 15 makes various settings on the basis of the print setting information and can execute the printing process on the basis of the settings. After executing the printing process, the MFP 15 transmits a printing-process completion notice to the workflow management server 11. In the printing process, printing is performed on a sheet and the sheet is output. Therefore, a result of the printing process is not transmitted to the workflow management server 11. Upon receiving the printing-process completion notice, the workflow management server 11 terminates the execution of the workflow A.

The workflow management system 10 allows a user to select and register a combination of frequently-used services in advance as workflow information, so that it becomes possible to save time and effort for selecting services or determining a combination of services every time the user uses the workflow.

The user is not limited to a system manager who registers the workflow information or a person who executes a workflow, but includes any person who uses the system. The input document is not limited to an electronic file that is stored, but includes a sheet document.

A problem with a conventional system that executes a workflow will be briefly explained below. A user may repeatedly execute the same workflow or a plurality of users may execute the same workflow. In such cases, there is a problem in that various costs, such as service charges or process time, are needed every time the user uses the workflow although the same processes of the same services are executed. The same problem also occurs when a plurality of users executes the same workflow.

For example, it is assumed that a user executes the workflow A illustrated in FIG. 1 by using a certain document. In the workflow A, the OCR service, the translation service, and the printing service are executed in this order. It is further assumed that the user repeats the workflow A by using the same document after an elapse of a predetermined period of time. In this case, if a past execution result is stored, it is possible to provide the services easily and at low cost by only outputting the result. However, conventionally, the result is not stored, so that the same OCR service, the same translation service, and the same printing service are repeated and a result of the processes is output. Therefore, both process time and usage cost are needed.

The same goes when the same user executes the workflow B illustrated in FIG. 1 by using the same document. The workflow B includes the same OCR service and the same translation service as those of the workflow A and further includes an e-mail service, which is different from any service of the workflow A and to be executed after the OCR service and the translation service. Therefore, the same processes as above are performed for the OCR service and the translation service. However, in the conventional workflow, even if the same services are included as described above, when a request is issued again, the OCR service and the translation service are repeated and thereafter the e-mail service is executed. Therefore, even in this case, process time and usage cost are needed.

To address the above problem with the conventional system, according to the present invention, a process result obtained in the middle of the executed workflow is stored, and, when the same workflow is to be repeated, the workflow is executed from a process in the middle of the workflow by using the stored result, so that execution of the same services can be omitted. Therefore, it is possible to reduce process time and save usage cost for the omitted services.

First Embodiment

In the fist embodiment, when a user executes the workflow A for the first time, the workflow management server 11 transmits an input document to the server apparatus 16 that executes the OCR service; receives a result of the OCR process from the server apparatus 16; transmits the result of the OCR process to the server apparatus 17 that executes the translation service; and receives a result of the translation process from the server apparatus 17. The workflow management server 11 generates a copy of the result of the translation process, stores the copy in the storage device 12, and transmits the result of the translation process to the MFP 15 that executes a printing service. The MFP 15 performs printing on a sheet on the basis of the result of the translation process, outputs the sheet, and terminates the execution of the workflow A.

Thereafter, when an execution request for the same workflow A using the same document is issued, the result of the translation process is read out from the storage device 12 and transmitted to the MFP 15 that executes the printing service being a subsequent service in the workflow A, so that only the printing service is executed. Then, the execution of the workflow A is terminated.

As described above, when the workflow A using the same document is executed for the second time, it is possible to omit the execution of the OCR service and the translation service and execute only the printing service. Therefore, it is possible to reduce process time and save usage cost.

Figure 4:
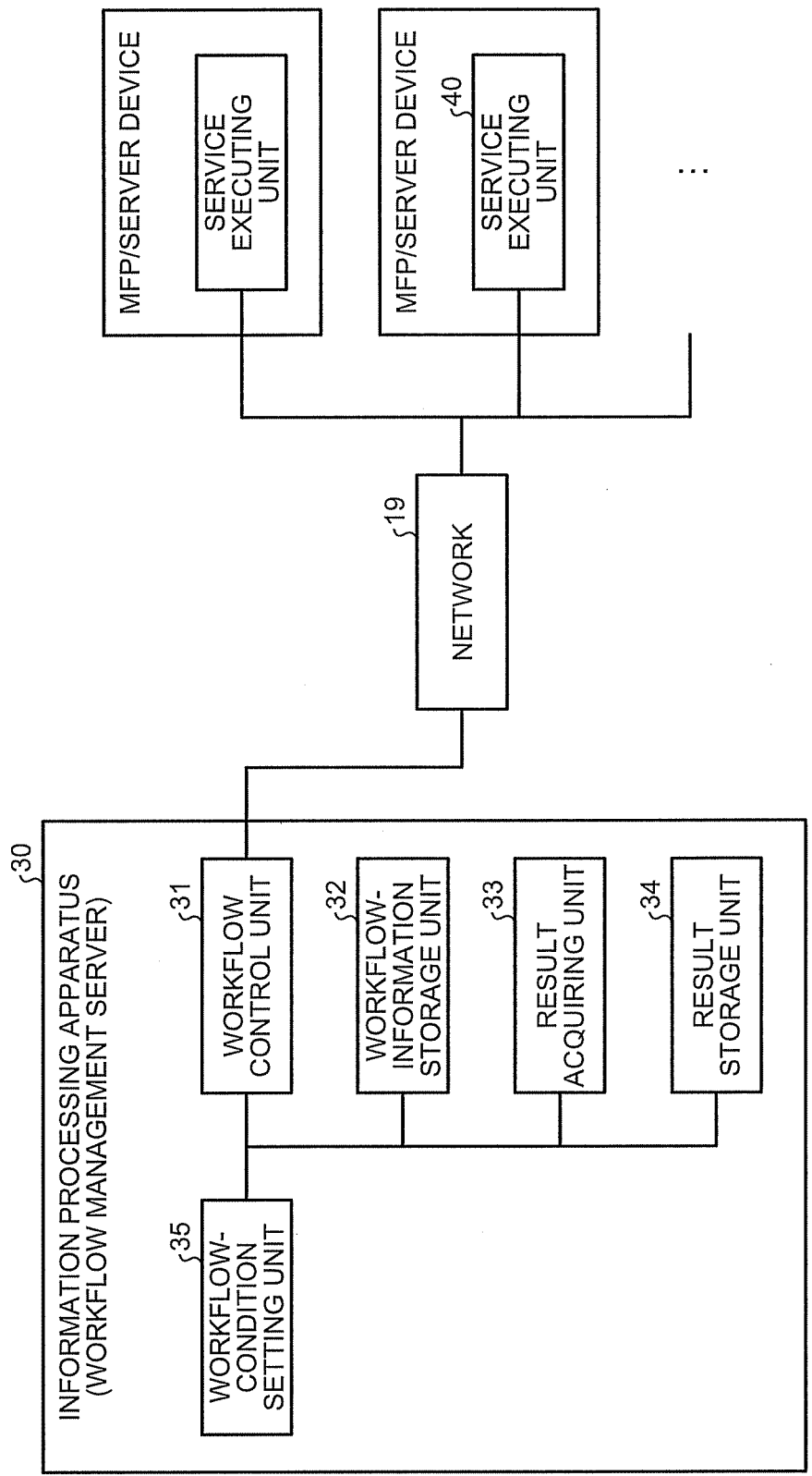
FIG. 4 is a functional block diagram of an information processing apparatus that functions as a workflow management server according to a first embodiment.

To store a process result obtained in the middle of a workflow that is executed for the first time, and to execute the workflow from a process in the middle of the workflow by using the process result when the workflow is to be executed for the second time, an information processing apparatus that functions as the workflow management server 11 includes units as illustrated in FIG. 4. An information processing apparatus 30 includes at least a workflow control unit 31, a workflow-information storage unit 32, a result acquiring unit 33, and a result storage unit 34. In FIG. 4, the information processing apparatus 30 also includes a workflow-condition setting unit 35; however, the workflow-condition setting unit 35 may be omitted.

The information processing apparatus 30 is connected to the MFPs 14 and 15 and the server apparatuses 16 to 18 via the network 19 illustrated in FIG. 2. Each of the MFPs 14 and 15 and the server apparatuses 16 to 18 includes a service executing unit 40 for executing various services. When providing the OCR service, the service executing unit 40 executes the OCR process and outputs a result of the OCR process. More specifically, the service executing unit 40 segments characters in an input document one by one, determines a character that is the most similar to the segmented character by using a template, converts the segmented character to the determined character, and outputs a result. When providing the translation service, the service executing unit 40 segments sentences included in a document on which the character recognition process has been performed, translates the characters into a different language and the like by using a dictionary, and outputs a result. When providing the printing service, the service executing unit 40 extracts and sets information, such as a sheet size, a character style, font, the number of characters, the number of sheets, or information on whether to perform color printing, duplex printing, or aggregate printing, from the print setting information included in the execution request. Thereafter, the service executing unit 40 performs image formation based on the setting, performs printing on a sheet, and outputs the sheet. The processes described above are by way of examples only and any known methods may be used for performing the character recognition process, the translation process, and the printing process.

The workflow-condition setting unit 35 of the information processing apparatus 30 generates a workflow by selecting services and making a sequence of the services when a user registers workflow information. The workflow-condition setting unit 35 also sets an input document when the workflow is executed. Thus, the workflow-condition setting unit 35 receives and sets a selected document and a selected workflow.

The workflow control unit 31 issues a request to acquire identification information for identifying the document and the workflow that are set in the workflow-condition setting unit 35 by the user, i.e., a document ID and a workflow ID, in accordance with a workflow execution request, and receives the document ID and the workflow ID from the workflow-condition setting unit 35.

The workflow control unit 31 searches for workflow information stored in the workflow-information storage unit 32 on the basis of the received workflow ID and acquires corresponding workflow information.

The workflow-information storage unit 32 stores therein the workflow information. The workflow information includes a workflow ID, a service identification ID, a setting condition, an input document ID, and a process result ID. The workflow ID is information for identifying a workflow and is set when the workflow information is registered. Examples of the workflow ID include "workflow A". The service identification ID is information for identifying a service and is specific to each service. The service identification ID is acquired and set from a service when the workflow information is registered. Examples of the service identification ID include an IP address and a name and a version of software that executes the service. When the workflow consists of three services, there are provided three pieces of identification information for identifying processes of the three services. For example, there are provided "OCR_A" for the OCR service, "translation_B" for the translation service, and "printing_A" for the printing service.

The setting condition is an execution condition that is needed when the service is executed. The setting condition is set by a user when the workflow information is registered. For example, "English" is set in association with "translation_B" as a language into which another language is translated or "black and white" is set in association with "printing_A" as a printing color. The input document ID is information for identifying an input document to be executed and is set in association with the process result ID when a process result of a service is set. Examples of the input document ID include a document name and a version of the input document. For example, "document_A" is set in association with the "translation_B". The process result ID is information for acquiring a process result and is set in association with the input document ID when the process result of the service is stored. Examples of the process result ID include a file name of the process result and an address at which the process result is stored. For example, "result_A" is set in association with "translation_B".

When the process result ID is set in the workflow information acquired by the workflow control unit 31, the result acquiring unit 33 acquires a corresponding process result from the result storage unit 34 on the basis of the process result ID. On the other hand, when a workflow is executed for the first time, because there is no process result, the workflow control unit 31 requests the MFP 14, the server apparatus 16, the server apparatus 17, or the server apparatus 18 to execute a process and acquires a process result. The workflow control unit 31 generates a copy of the acquired process result, transmits the process result to a apparatus that executes a subsequent process (the MFP 14, the MFP 15, the server apparatus 16, the server apparatus 17, or the server apparatus 18 in FIG. 2), assigns a process result ID to the copy, sets the process result ID in the workflow information, and stores the copy together with the process result ID in the result storage unit 34.

Figure 5:
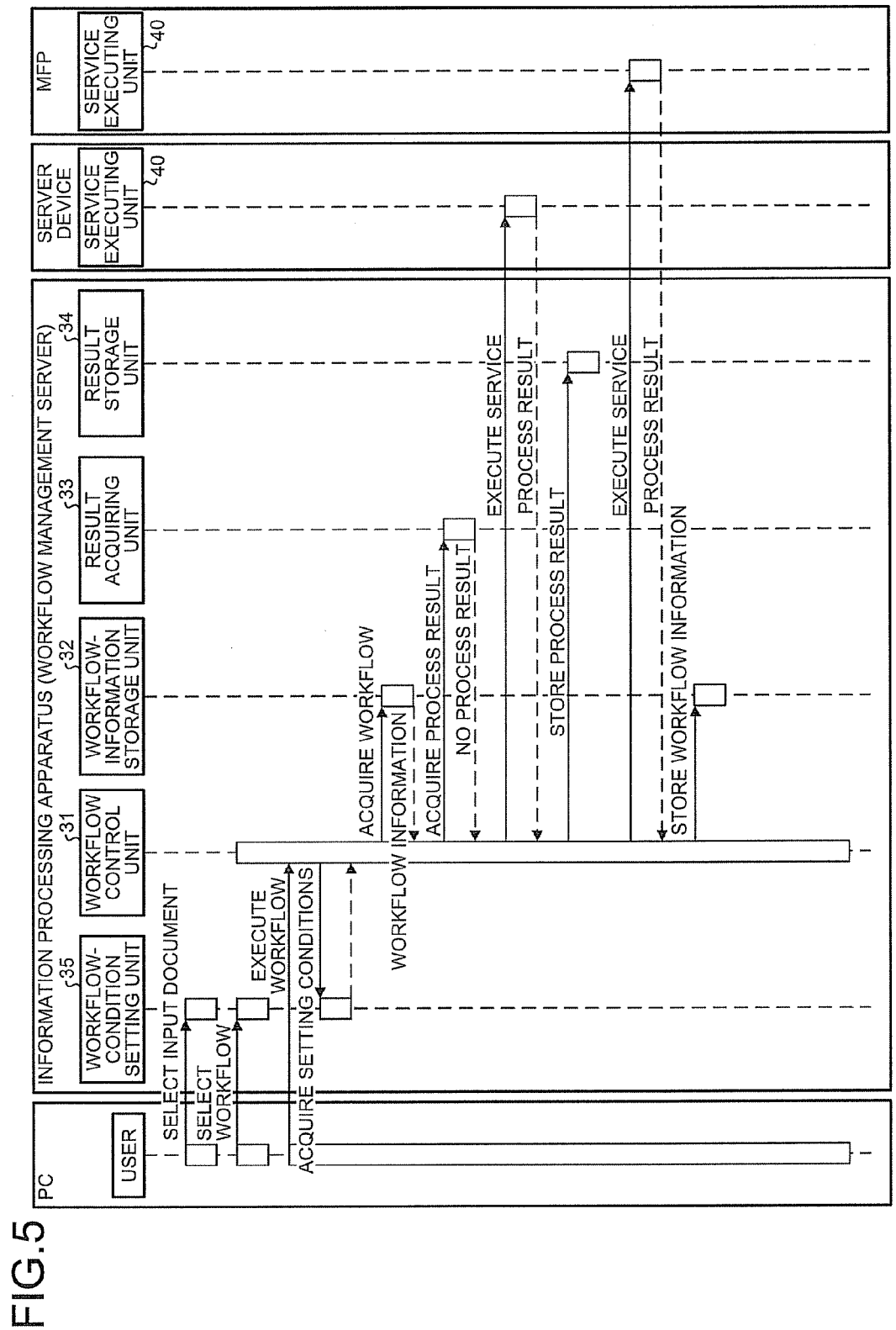
FIG. 5 is a sequence diagram of flow of processes performed when a workflow is executed for the first time.
Figure 6:
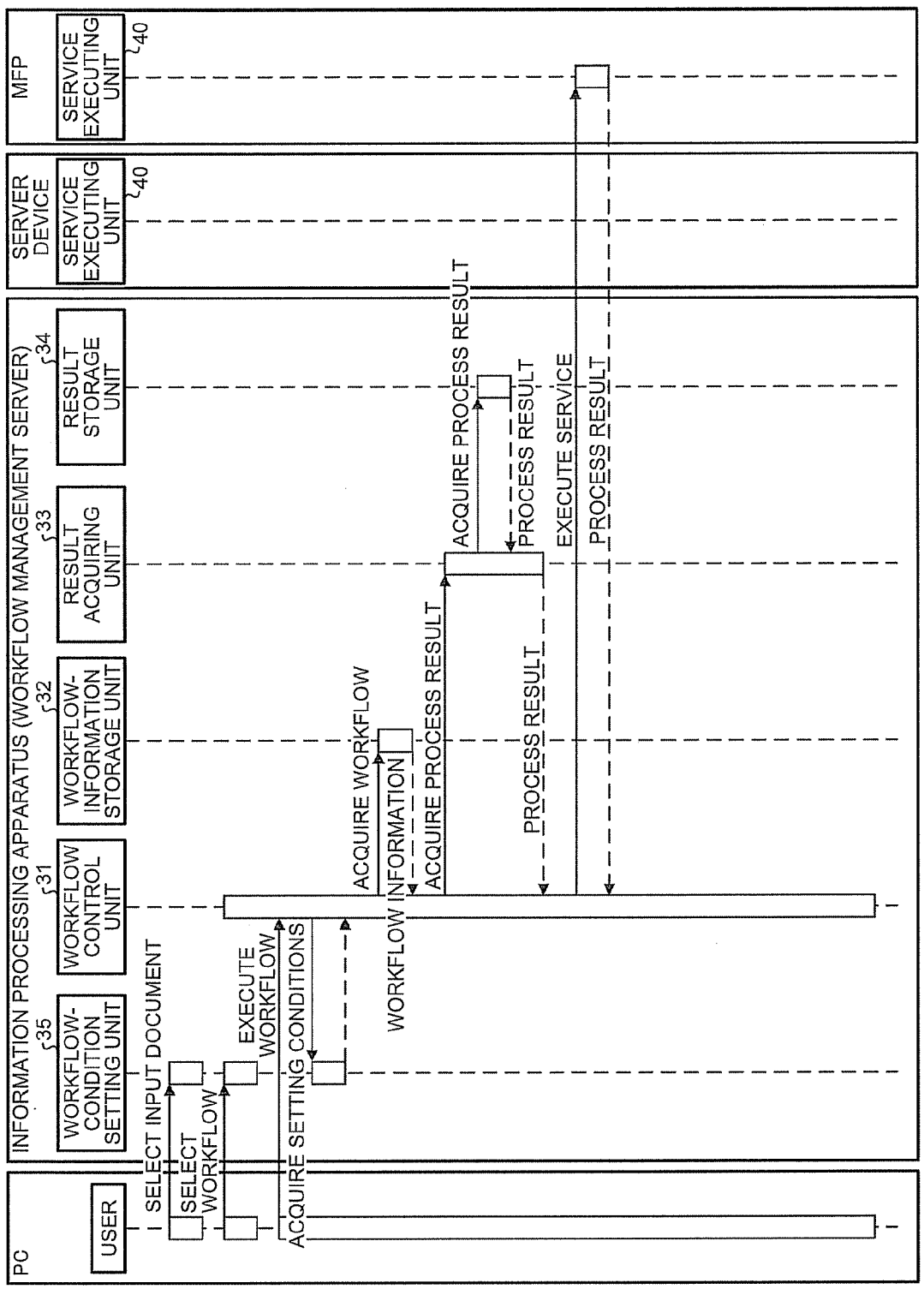
FIG. 6 is a sequence diagram of flow of processes performed when the workflow is repeated.

A workflow execution method according to the present invention will be explained in detail below with reference to sequence diagrams in FIGS. 5 and 6 and a flowchart in FIG. 7. A case will be explained below with reference to FIG. 5, in which a workflow is executed for the first time. A user who uses the system selects an input document and a workflow and transmits the input document and the workflow to the workflow-condition setting unit 35 to set the input document and the workflow, by using the PC 13 or the like that the user manages. Thereafter, the user instructs the workflow control unit 31 to execute the workflow by using the PC 13.

Upon receiving the instruction, the workflow control unit 31 transmits a request for acquisition of setting conditions to the workflow-condition setting unit 35 and receives the setting conditions, i.e., an input document ID of the input document and a workflow ID of the workflow, from the workflow-condition setting unit 35. Thereafter, the workflow control unit 31 searches for workflow information stored in the workflow-information storage unit 32 on the basis of the workflow ID and acquires corresponding workflow information.

The workflow control unit 31 attempts to acquire a process result on the basis of a process result ID set in the workflow information. More specifically, the workflow control unit 31 accesses the result acquiring unit 33 and instructs the result acquiring unit 33 to acquire a process result. However, when the workflow is executed for the first time, because there is no process result, the result acquiring unit 33 returns a result indicating that there is no process result to the workflow control unit 31. Upon receiving the result, the workflow control unit 31 transmits the document and an execution request to an apparatus that executes the first service so that the workflow is executed from the first service. The workflow control unit 31 receives a process result from the apparatus, generates a copy of the process result, and transmits the process result and an execution request to an apparatus that executes a subsequent service. The copy is stored in the result storage unit 34 in association with the process result ID. The process result is stored in the result storage unit 34 every time a process result is obtained by execution of each service.

After acquiring the process result from the last apparatus, the workflow control unit 31 registers the input document ID and the process result ID corresponding to each process result in an associated manner in the workflow information stored in the workflow-information storage unit 32, and terminates the execution of the workflow.

A case will be explained below with reference to FIG. 6, in which the same workflow using the same document is repeated. Because the workflow is to be executed, the following processes are the same as above: a user selects a document and a workflow; the user transmits a workflow execution request; the workflow control unit 31 acquires setting conditions set in the workflow-condition setting unit 35; and the workflow control unit 31 acquires workflow information stored in the workflow-information storage unit 32.

The workflow control unit 31 extracts a process result ID from the acquired workflow information and transmits the process result ID and a request for acquisition of a process result to the result acquiring unit 33. The result acquiring unit 33 searches through the result storage unit 34 on the basis of the process result ID, acquires a corresponding process result, and transmits the process result to the workflow control unit 31. Thereafter, the workflow control unit 31 repeats a process of transmitting a process result and an execution request to an apparatus that executes a subsequent service and acquiring a process result from the apparatus. When acquiring a process result form an apparatus that executes the last service, the workflow control unit 31 terminates the execution of the workflow. As described above, it is possible to execute the workflow from a service in the middle of the workflow instead of executing the workflow in order from the first service. Therefore, it is possible to reduce process time and save usage cost.

The above workflow execution processes are integrated into the flow illustrated in FIG. 7. The process starts at Step S700 in FIG. 7. A user establishes a communication between the PC 13 that the user uses and the information processing apparatus 30 that functions as the workflow management server 11, acquires, a screen for selecting an input document and a workflow from the information processing apparatus 30, and displays the screen. For example, the user activates a Web browser installed in the PC 13, opens a login screen that is registered in advance, and inputs a user ID and a password to transmit the user ID and the password to the information processing apparatus 30. Then, the information processing apparatus 30 authenticates the user ID and the password, so that it becomes possible to acquire the screen, possessed by the information processing apparatus 30, for selecting the input document and the workflow from the information processing apparatus 30 and display the screen on a display of the PC 13.

The user selects a document to be processed from among one or more input documents being displayed by using an input device, selects a workflow to be executed from among one or more workflows by using the input device, and requests execution by, for example, pressing an execution button. At Step S705, the workflow-condition setting unit 35 of the information processing apparatus 30 receives an input document ID and a workflow ID for identifying the selected document and the selected workflow. At Step S710, the workflow control unit 31 receives an execution request. Upon receiving the execution request, the workflow control unit 31 issues a request for acquisition of setting conditions set in the workflow-condition setting unit 35 and acquires the setting conditions. In this example, the workflow control unit 31 acquires the input document ID and the workflow ID from the workflow-condition setting unit 35.

At Step S715, the workflow control unit 31 acquires workflow information of a workflow to be executed from the workflow-information storage unit 32 on the basis of the acquired workflow ID. The workflow control unit 31 requests the result acquiring unit 33 to acquire a process result corresponding to the input document ID of the input document set in the workflow-condition setting unit 35. At Step S720, the result acquiring unit 33 examines correspondence of the input document ID included in the workflow information in order from the last service to the first service to be executed.

At Step S725, it is determined whether the input document ID included in the workflow information and the input document ID of the input document set in the workflow-condition setting unit 35 match each other. When the workflow is executed for the first time as illustrated in FIG. 5, because the input document ID of the input document has not been stored in the result storage unit 34, it is determined that the input document IDs do not match each other.

At Step S725, when it is determined that the input document IDs do not match each other, the process proceeds to Step S730, at which the workflow control unit 31 requests execution of the services in order from the first service of the workflow. Specifically, the workflow control unit 31 transmits the input document to an apparatus that executes the first service of the workflow. At Step S735, when receiving a process result from the apparatus, the workflow control unit 31 generates a copy of the process result, transmits the process result to a next apparatus, and stores the copy in the result storage unit 34. In this case, it is possible to transmit the copy to the next apparatus and store the process result in the result storage unit 34. At Step S740, when receiving a process result from the next apparatus, the workflow control unit 31 associates the input document ID with a process result ID corresponding to the process result and stores the input document ID and the process result ID in the workflow information in the workflow-information storage unit 32. At Step S755, the first execution of the workflow is terminated.

At Step S725, when it is determined that the input document IDs match each other, because the workflow is being repeated, the process proceeds to Step S745, at which the result acquiring unit 33 acquires a process result that corresponds to a process result ID associated with the input document ID detected by the examination, from the result storage unit 34 on the basis of the process result ID. At Step S750, the workflow control unit 31 acquires the service identified by the result acquiring unit 33 and the process result corresponding to the service from the result acquiring unit 33 and transmits the process result and an execution request to a apparatus that executes a subsequent service in the workflow, so that the workflow can be executed from a service in the middle of the workflow. When a process result is received from the apparatus, the execution of the workflow is terminated at Step S755.

The workflow information can be stored in the workflow-information storage unit 32 in such a manner that the workflow information is structured as a table as illustrated in FIGS. 8A and 8B and the input document ID and the process result ID are recorded and registered in respective input fields in the table. In FIGS. 8A and 8B, the tables are structured so that the input document ID and the process result ID can be recorded for each of the OCR service and the printing service. More specifically, FIG. 8A illustrates a state in which a workflow has never been executed and nothing is recorded, and FIG. 8B illustrates a state in which an input document ID and a process result ID of a process result obtained by execution of the OCR service are recorded after a workflow is once executed. In FIG. 8B, "document A" is recorded as the input document ID and "result A" is recorded as the process result ID.

With reference to the flow illustrated in FIG. 7, when the workflow information illustrated in FIG. 8A is used, it is determined that the input document IDs do not match each other at Step S725, so that the processes at Steps S730 to S740 are executed and the workflow information as illustrated in FIG. 8B is obtained. When the workflow information illustrated in FIG. 8B is used, it is determined that the input document IDs match each other at Step S725, so that the process result of the OCR service is acquired at Step S745, the process result is transmitted to a apparatus that executes a subsequent printing service at Step S750, and a process result is acquired from the apparatus.

In the embodiment described above, a process result of each service is stored when a workflow is executed, and, when the workflow is to be repeated, the stored process result is used in order to execute the workflow from a process in the middle of the workflow. Therefore, it is possible to execute the workflow quickly and at low cost. However, because there is infinite number of combinations of services on the network, if all intermediate results for each workflow are stored, there is a problem in that a large part of the storage area of the storage device may be used up.

To suppress the amount of process results to be stored, the following method may be employed. In FIGS. 9A and 93, the workflow A and the workflow B are illustrated and the OCR service and the translation service are common to both of the workflows.

For example, let us consider a case in which a user registers the workflow B while the workflow A is already registered, executes the workflow A once, and thereafter executes the workflow B. In the above embodiment, because the workflow B is executed for the first time, the OCR service, the translation service, and the e-mail service are executed in this order and execution results of the respective services are recorded. However, as described above, the OCR service and the translation service in the workflow B are the same as those of the workflow A. Therefore, when the user registers the workflow B, a process result to be stored is set as a storing object in order to prevent redundant process results from being stored, so that the used amount of the storage area can be reduced.

More specifically, services included in the workflow to be registered are compared with services included in the workflow that is already registered, in order of execution, and different services having different process contents are determined. It is regarded that the same execution procedures are applied to the services before the different services in both of the compared workflows, and a process result of a service immediately preceding the different services is determined as a storing object. For instance, in the above example, because the OCR service and the translation service are common to the workflows, a process result of the translation service is determined as the storing object.

When the workflow A is executed, the process result of the translation service is stored as the storing object of the workflow A. When the workflow B is executed on the same input document, only the e-mail service is executed by using the process result that has been stored by the execution of the workflow A. As described above, even when the workflows to be executed are different, if the input document and partway of the execution procedures of the services are common to the workflows, it is possible to execute the workflow from a process in the middle of the workflow by using an intermediate process result that has been stored. As described above, because only one process result is stored for two workflows and other process results are not stored, it is possible to reduce the amount of data to be stored.

Figure 10:
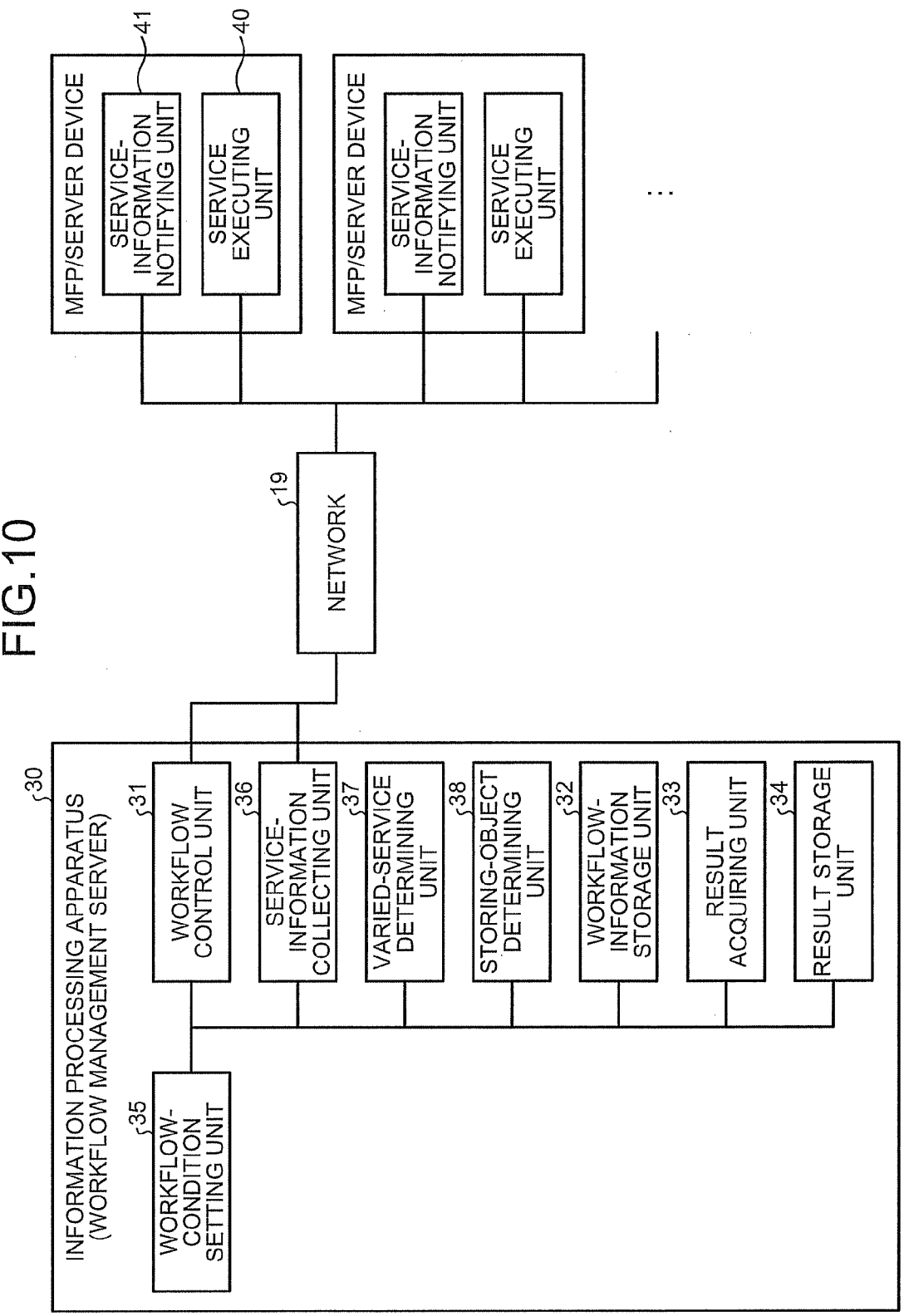
FIG. 10 is a functional block diagram of an information processing apparatus according to a second embodiment.

The workflow management system has the same system configuration as illustrated in FIG. 2. Each of the MFPs, the server apparatuses, and the workflow management server as the information processing apparatus included in the workflow management system has the same hardware configuration as illustrated in FIG. 3. However, a module structure of the information processing apparatus is different from that of FIG. 4. As illustrated in FIG. 10, the information processing apparatus 30 that functions as the workflow management server further includes a service-information collecting unit 36, a varied-service determining unit 37, and a storing-object determining unit 38 in addition to the workflow-condition setting unit 35, the workflow control unit 31, the workflow-information storage unit 32, the result acquiring unit 33, and the result storage unit 34.

Each of the MFPs 14 and 15 and the server apparatuses 16 to 18 that executes various services further includes a service-information notifying unit 41 in addition to the service executing unit 40 illustrated in FIG. 4.

The workflow information includes a workflow ID, a service identification ID, a setting condition, an input document ID, and a process result ID, similarly to the above. The workflow information also includes a storing object and a workflow ID with the same storing object.

The workflow ID and the like are the same as those described above, and therefore, the explanation thereof is not repeated. In the following, the storing object and the workflow ID with the same storing object will be explained. The storing object is information for determining whether a storing object is set, and is set when the workflow is registered. For example, "O" may be set when the storing object is set and "X" may be set when the storing object is not set. The workflow ID with the same storing object is information for acquiring a workflow having the same process result. Specifically, a workflow ID as an object to be compared is set when the storing object is set. For example, "B" can be set when the workflow B is the object to be compared.

The service-information collecting unit 36 acquires service information, which is information for identifying a service, from the MFP 14, the MFP 15, the server apparatus 16, the server apparatus 17, or the server apparatus 18. The service information includes a service identification ID. Examples of the service identification ID include an IP address and a name and a version of software that executes the service.

The varied-service determining unit 37 compares a workflow that is to be registered with a workflow that has already been registered and determines a different service as a varied service. The storing-object determining unit 38 determines a service whose process result is to be stored when the workflow is executed.

The service-information notifying unit 41 notifies the information processing apparatus 30, which is the workflow management server, of the service identification ID for identifying a service.

Second Embodiment

Figure 11:
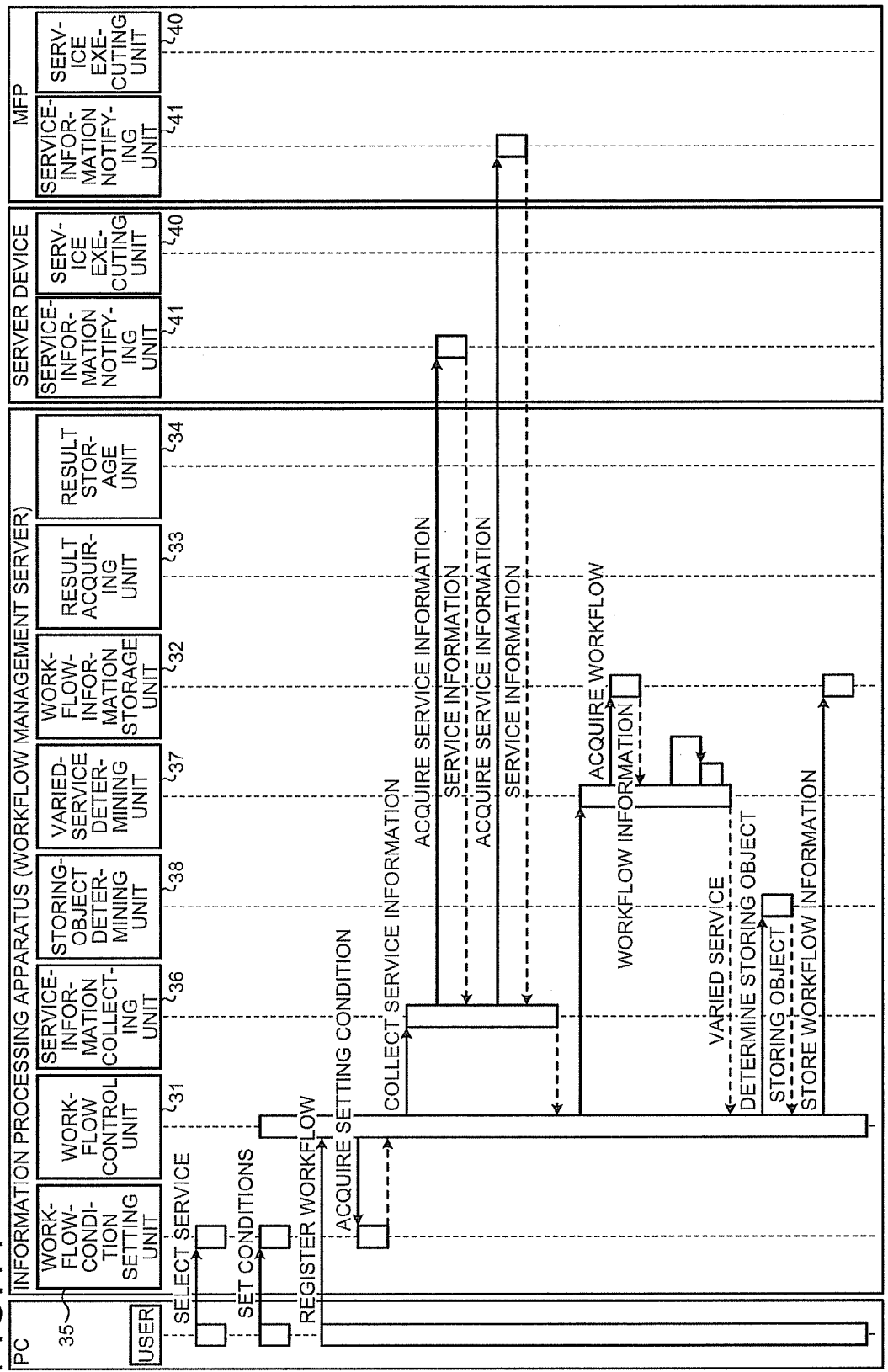
FIG. 11 is a sequence diagram of flow of processes for registering a workflow.

A workflow execution method of the second embodiment will be explained in detail below with reference to sequence diagrams in FIGS. 11 to 13 and flowcharts in FIGS. 14 and 15. FIG. 11 is a sequence diagram of flow of processes for registering a workflow. A user who uses the system selects services and transmits a combination of the services and an order of the services to the workflow-condition setting unit 35 to set the combination and the order, by using the PC 13 or the like that the user manages. Thereafter, the user transmits a workflow registration request to the workflow control unit 31 by using the PC 13 or the like.

The workflow control unit 31 receives the registration request, transmits a request for acquisition of setting conditions to the workflow-condition setting unit 35, and receives the setting conditions, i.e., the combination and the order of the services, from the workflow-condition setting unit 35. Thereafter, the service-information collecting unit 36 receives the information, transmits to the service-information notifying unit 41 a request for acquisition of service information of each service on the basis of the combination of the services, and acquires the service information of each apparatus from the service-information notifying unit 41. As described above, the service information includes an IP address of the apparatus and a service identification ID, so that it is possible to communicate with the apparatus as well as to identify the apparatus by using the IP address. The service information is acquired from each apparatus through communication with all apparatuses that execute respective services included in the workflow to be registered.

The workflow control unit 31 receives pieces of the service information having been collected by the service-information collecting unit 36, compares the workflow to be registered with a workflow that has already been registered, and transmits the acquired pieces of the service information arranged in order of execution to the varied-service determining unit 37 in order to determine a different service. The varied-service determining unit 37 accesses the workflow-information storage unit 32 to acquire workflow information, compares the services in order from the first service in the workflow information, and determines a different service as the varied service.

The storing-object determining unit 38 receives a determination result from the varied-service determining unit 37 and determines, as the storing object, a process result obtained by a service preceding the different service determined by the varied-service determining unit 37. The storing-object determining unit 38 transmits information on a process result of the determined storing object to the workflow control unit 31. The workflow control unit 31 stores, in the workflow-information storage unit 32, workflow information on the workflow to be registered.

Figure 12:
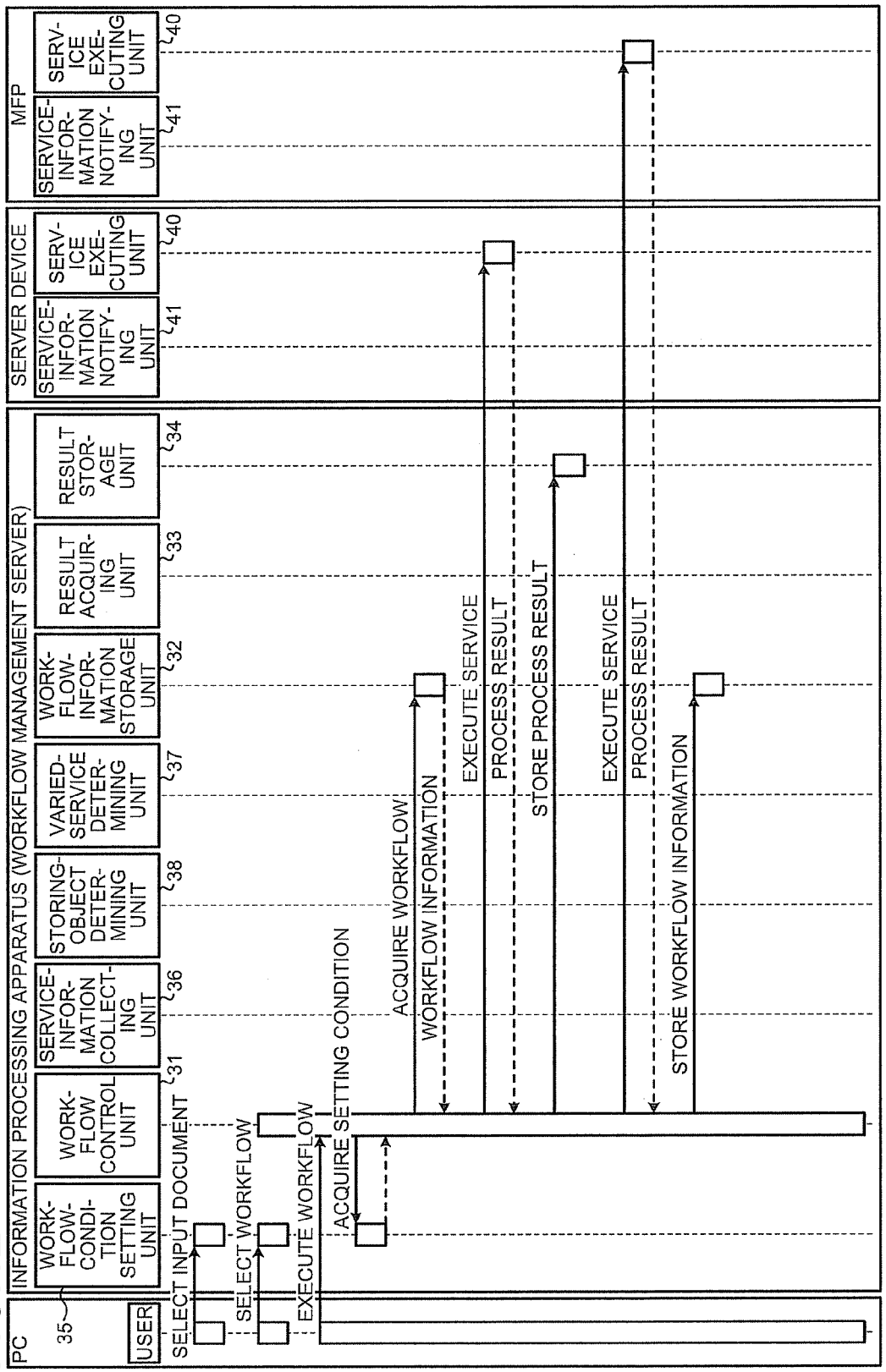
FIG. 12 is a sequence diagram of flow of processes performed when a workflow is executed for the first time.

FIG. 12 is a sequence diagram for executing a workflow in order from the first service. A user who uses the system selects an input document and a workflow and transmits the input document and the workflow to the workflow-condition setting unit 35 to set the input document and the workflow, by using the PC 13 that the user manages. Thereafter, the user transmits a workflow execution request to the workflow control unit 31 by using the PC 13.

The workflow control unit 31 communicates with the workflow-condition setting unit 35 to request acquisition of the setting conditions, i.e., the input document ID of the input document and the workflow ID of the workflow, and acquires the IDs from the workflow-condition setting unit 35. Thereafter, the workflow control unit 31 acquires workflow information stored in the workflow-information storage unit 32 on the basis of the acquired workflow ID.

The workflow control unit 31 transmits the document and an execution request to an apparatus that executes the first service so as to execute the workflow in order from the first service. The workflow control unit 31 receives a process result from the apparatus, generates a copy of the process result, and transmits the process result and an execution request to an apparatus that executes a subsequent service. The copy is stored in the result storage unit 34 in association with a process result ID. The process result is stored in the result storage unit 34 every time a process result is obtained by execution of a service.

After acquiring the process result from the last apparatus, the workflow control unit 31 registers the input document ID and process result IDs of respective process results in the workflow information stored in the workflow-information storage unit 32 in an associated manner. Then, the execution of the workflow is terminated.

Figure 13:
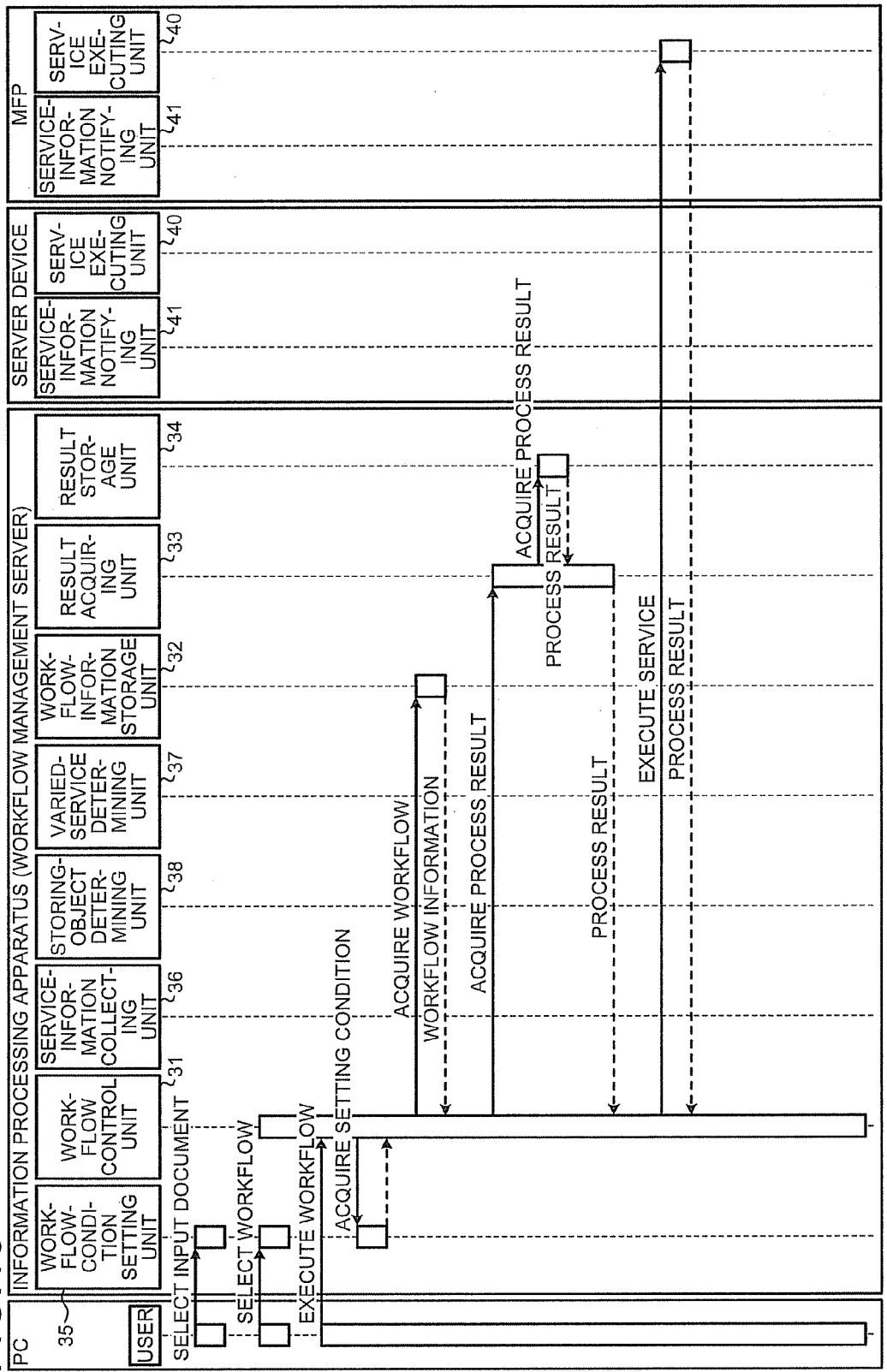
FIG. 13 is a sequence diagram of flow of processes performed when a workflow that is executed is to be repeated.

FIG. 13 is a sequence diagram for repeating the same workflow on the same document. Because the workflow is to be executed, the following processes are the same as above: a user selects a document and a workflow; the user transmits a workflow execution request; the workflow control unit 31 acquires setting conditions set in the workflow-condition setting unit 35; and the workflow control unit 31 acquires workflow information stored in the workflow-information storage unit 32.

The workflow control unit 31 extracts a process result ID from the acquired workflow information and transmits the process result ID and a request for acquisition of a process result to the result acquiring unit 33. The result acquiring unit 33 searches through the result storage unit 34 on the basis of the process result ID, acquires a corresponding process result, and transmits the process result to the workflow control unit 31. Thereafter, the workflow control unit 31 repeats a process of transmitting a process result and an execution request to an apparatus that executes a subsequent service and acquiring a process result from the apparatus. When acquiring a process result from an apparatus that has executed the last service, the workflow control unit 31 terminates the execution of the workflow. As described above, it is possible to execute the workflow from a service in the middle of the workflow instead of executing the workflow in order from the first service. Therefore, it is possible to reduce process time and save usage cost.

Figure 14:
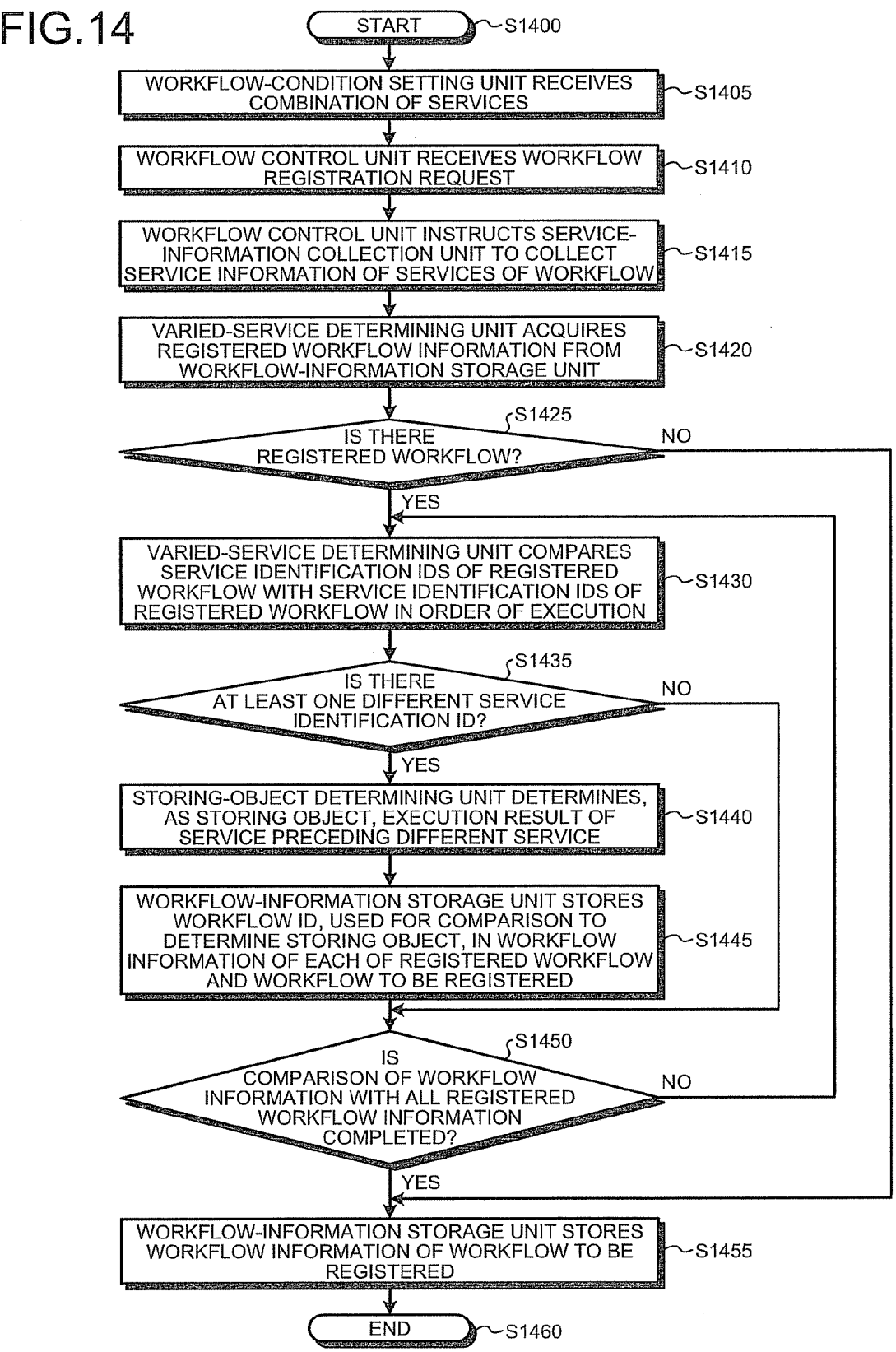
FIG. 14 is a flowchart of processes for registering a workflow.
Figure 15:
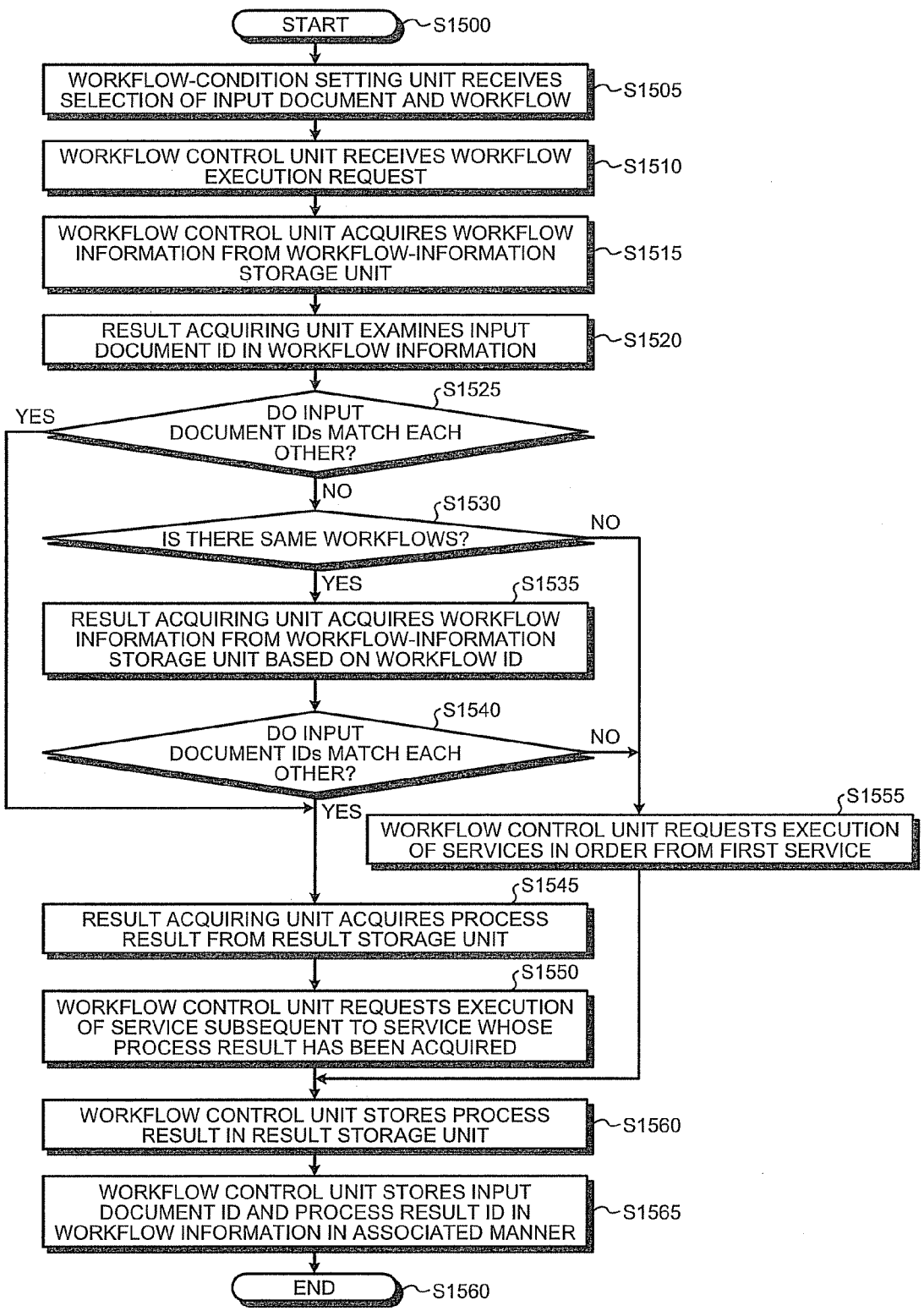
FIG. 15 is a flowchart of processes for executing a workflow.

The above workflow registration and execution processes are integrated into the flows illustrated in FIGS. 14 and 15. First, registration of a workflow will be explained. The process starts at Step S1400 in FIG. 14. A user establishes a communication between the PC 13 that the user uses and the information processing apparatus 30 that functions as the workflow management server 11, acquires a screen for registering a workflow from the information processing apparatus 30, and displays the screen. For example, the user activates a Web browser installed in the PC 13, opens a login screen that is registered in advance, inputs a user ID and a password, and transmits the user ID and the password to the information processing apparatus 30. Then, the information processing apparatus 30 authenticates the user ID and the password, so that it becomes possible to acquire the screen for registering a workflow from the information processing apparatus 30 and display the screen on the display of the PC 13.

The user selects services of a workflow in order of execution from among one or more services being displayed in the registration screen and requests registration by, for example, pressing a registration button. At Step S1405, the workflow-condition setting unit 35 of the information processing apparatus 30 receives the selected combination and the order of execution of the services. At Step S1410, the workflow control unit 31 receives a registration request. At Step S1415, in response to the received registration request, the workflow control unit 31 transmits an instruction to the service-information collecting unit 36 to cause the service-information collecting unit 36 to transmit a request for acquisition of service information to apparatuses that execute the respective services selected by the user and to acquire the service information.

At Step S1420, the varied-service determining unit 37 receives the service information acquired by the workflow control unit 31 and acquires workflow information stored in the workflow-information storage unit 32. At Step S1425, the varied-service determining unit 37 determines whether there is registered workflow information that has already been registered. When there is the registered workflow information, the process proceeds to Step S1430, at which the varied-service determining unit 37 compares the service identification IDs of pieces of the service information arranged in order of execution with the service identification IDs included in the registered workflow information, in order of execution. At Step S1435, it is determined whether there is at least one different service identification ID.

When it is determined that there is at least one different service identification ID at Step S1435, the process proceeds to Step S1440, at which the storing-object determining unit 38 determines, as a storing object, an execution result of a service preceding the different service. At Step S1445, the workflow control unit 31 stores the workflow ID, that is used for comparison to determine the storing object, in workflow information of each of the workflow that has already been registered and the workflow that is to be registered.

At Step S1450, it is determined whether comparison of the workflow information with all pieces of the registered workflow information is completed. When the comparison of the workflow information with all pieces of the registered workflow information is completed, the process proceeds to Step S1455, at which the workflow control unit 31 stores and registers, in the workflow-information storage unit 32, the workflow information of the workflow to be registered. After this registration, the registration process is terminated at Step S1460.

At Step S1425, when there is no registered workflow information, the process proceeds to Step S1455, at which the workflow information of the workflow to be registered is registered as it is. At Step S1435, when it is determined that all pieces of the service information are common to the workflows, the process proceeds to Step S1450, at which it is determined whether comparison with all pieces of the workflow information is completed. When the comparison of the workflow information with all pieces of the registered workflow information is not completed, the process returns to Step S1430, at which service identification IDs included in next registered workflow information are compared in order of execution.

Next, execution of a workflow will be explained below. The process starts at Step S1500 in FIG. 15. A user establishes a communication between the PC 13 that the user uses and the information processing apparatus 30 that functions as the workflow management server 11, acquires a screen for selecting a workflow from the information processing apparatus 30, and displays the screen. For example, the user activates a Web browser installed in the PC 13, opens a login screen that is registered in advance, and inputs a user ID and a password to transmit the user ID and the password to the information processing apparatus 30. Then, the information processing apparatus 30 authenticates the user ID and the password, so that it becomes possible to acquire the screen, possessed by the information processing apparatus 30, for selecting the workflow from the information processing apparatus 30 and display the screen on a display of the PC 13.

The user selects a document to be processed from among one or more input documents being displayed by using an input device, selects a workflow to be executed from among one or more workflows by using the input device, and requests execution of the workflow by for example, pressing an execution button. At Step S1505, the workflow-condition setting unit 35 of the information processing apparatus 30 receives an input document ID and a workflow ID for identifying the selected document and the selected workflow. At Step S1510, the workflow control unit 31 receives the execution request of the workflow. Upon receiving the execution request, the workflow control unit 31 issues a request for acquisition of setting conditions set in the workflow-condition setting unit 35 and acquires the setting conditions. In this example, the workflow control unit 31 acquires the input document ID and the workflow ID from the workflow-condition setting unit 35.

At Step S1515, the workflow control unit 31 acquires workflow information of a workflow to be executed from the workflow-information storage unit 32 on the basis of the acquired workflow ID. The workflow control unit 31 requests the result acquiring unit 33 to acquire a process result corresponding to the input document ID of the input document set in the workflow-condition setting unit 35. At Step S1520, the result acquiring unit 33 examines correspondence of the input document ID included in the workflow information in order from the last service to the first service to be executed.

At Step S1525, it is determined whether the input document ID included in the workflow information and the input document ID of the input document set in the workflow-condition setting unit 35 match each other. When the workflow is executed for the first time as illustrated in FIG. 5, because the input document ID of the input document has not been stored in the result storage unit 34, it is determined that the input document IDs do not match each other.

At Step S1525, when it is determined that the input document IDs do not match each other, the process proceeds to Step S1530, at which it is determined whether there are workflows having the same storing object. When there are such workflows, the process proceeds to Step S1535, at which the result acquiring unit 33 acquires from the workflow-information storage unit 32, on the basis of the workflow IDs with the same storing objects, pieces of workflow information having the workflow IDs with the same storing objects.

At Step S1540, it is determined whether the input document ID included in the acquired workflow information matches the input document ID set by the workflow-condition setting unit 35. When it is determined that the input document IDs match each other at Step S1540 or when it is determined that the input document IDs match each other at Step S1525, the process proceeds to Step S1545. In this case, because the workflow is being repeated, the result acquiring unit 33 acquires, at Step S1545, a process result corresponding to a process result ID associated with the input document ID detected by the examination, from the result storage unit 34 on the basis of the process result ID. At Step S1550, the workflow control unit 31 acquires a service identified by the result acquiring unit 33 and a process result corresponding to the service from the result acquiring unit 33 and transmits the process result and an execution request to an apparatus that executes a subsequent process in the workflow, so that the workflow can be executed from a service in the middle of the workflow. Thereafter, the process proceeds to Step S1560.

When it is determined that there is no workflow information having the same storing object at Step S1530 or when it is determined that the input document IDs do not match each other at Step S1540, the process proceeds to Step S1555, at which the workflow control unit 31 requests execution of the services in order from the first service of the workflow. At Step S1560, when receiving a process result from an apparatus that executes the first service of the workflow, the workflow control unit 31 generates a copy of the process result, transmits the process result to a next apparatus, and stores the copy in the result storage unit 34. In this case, it is possible to transmit the copy to the next apparatus and store the process result in the result storage unit 34. At Step S1565, when receiving a process result from the next apparatus, the workflow control unit 31 associates the input document ID with a process result ID corresponding to the process result and stores the input document ID and the process result ID in the workflow information in the workflow-information storage unit 32. At Step S1570, the first execution of the workflow is terminated.

In the comparison at Step S1430 in FIG. 14, when, for example, the workflow A consisting of the OCR service and the printing service to be executed in this order is set to the registered workflow information while the workflow B consisting of the OCR service and the e-mail service to be executed in this order is set to the workflow information to be registered, it is determined that the first OCR services are identical because they are common to the workflows and it is also determined that the printing service and the e-mail service are different because they are different between the workflows. At Step S1435, a process result of the service preceding the different service, i.e., a process result of the OCR service, is determined as a storing object.

The workflow information can be stored in the workflow-information storage unit 32 in such a manner that the workflow information is structured as a table as illustrated in FIGS. 16A to 16C and the input document ID and the process result ID are recorded and registered in respective input fields in the table. In FIGS. 16A to 16C, the tables are structured so that the workflow ID with the same storing object, the input document ID, and the process result ID can be recorded for each of the OCR service and the printing service or for each of the OCR service and the e-mail service.

FIGS. 16A and 16B illustrate examples of workflow information obtained when the workflow A and the workflow B are registered but none of the workflows has been executed. Because workflow IDs used for comparison at Step S1445 in FIG. 14 are stored in the tables, "B" being the workflow ID of the workflow B is stored in the workflow information of the workflow A while "A" being the workflow ID of the workflow A is stored in the workflow information of the workflow B.

FIG. 16C illustrates an example of workflow information obtained after the workflow A is executed. By the execution of the workflow, "document A" being the input document ID and "location A" being the process result ID are stored.

It may be possible to collect usage charge information as the service information to be collected from the apparatuses that execute respective services at the time of registration of the workflow and to determine a storing object on the basis of the usage charge information. With reference to the above example, when the usage charge for the OCR service of the workflow A is 0 Japanese yen and the usage charge for the OCR service of the workflow B is 300 Japanese yen, it is possible to make settings so that only an execution result of the OCR service of the workflow B, for which the usage charge is charged, is stored without storing an execution result of the OCR service of the workflow A, for which the usage charge is not charged.

Suppose that a workflow D consists of the OCR service and the printing service to be executed in this order, a workflow E consists of the OCR service, the translation service, and the e-mail service to be executed in this order, and a workflow F consists of the OCR service, the translation service, and the e-mail service to be executed in this order. In this case, when the workflow E and the workflow F are compared with each other, the OCR service and the translation service are common to both of the workflows and an execution result of the translation service, which is a service immediately preceding the printing service or the e-mail service that is the varied service, is determined as the storing object. However, when a plurality of workflows, i.e., the workflow D to F, are compared with one another, because the translation service is not common to the workflow D, it is possible to set an execution result of the OCR service, which is common to all of the workflows, as the storing object and not to store other results. Therefore, an execution result of the translation service that is common to the workflows E and F is not stored, so that the amount of data to be stored can be reduced.

When the input document is document data, a workflow can be executed in the above-described manner. However, the document is not limited to the document data and may be a paper. As a workflow to be executed in the case of a paper, there are a workflow G consisting of the scanning service, the OCR service, and the printing service to be executed in this order and a workflow H consisting of the scanning service, the OCR service, and the e-mail service to be executed in this order.

When the workflow G is first executed and thereafter the workflow H is executed, because the scanning service and the OCR service are common to both of the workflows, it is determined whether the documents are the same. When the documents are the same, it is possible to reduce process time and save usage cost by executing only the e-mail service by using an execution result of the OCR service.

More specifically, when the workflow G is executed, a scanned image as an input document image is transmitted to an apparatus that executes the OCR service. After the OCR service is executed, the input document image is stored in the workflow information in association with a process result ID of a result of the OCR service being the storing object. Then, a scanned image obtained at the time of execution of the workflow H is compared with the input document image that has been stored. When the images match each other, the process result is acquired by using the process result ID associated with the image and is transmitted to an apparatus that executes the e-mail service in order to execute the e-mail service.

A paper document may include characters and images as well as any markings such as codes or signs for identifying the document. Examples of the marking include a barcode and a QR code. In this case, when the workflow G is executed, the marking is read and marking information is stored in the workflow information in association with a process result ID of a process result obtained by execution of the OCR service being the storing object. When the workflow H is to be executed, marking information of a marking that is read at this time is compared with the marking information that has been stored. When the marking information is identical, the process result is acquired by using the process result ID associated with the marking information and is transmitted to an apparatus that executes the e-mail service in order to execute the e-mail service.

Some apparatuses that execute services may have functions of storing intermediate results during execution of the services. For example, when performing aggregate printing, an MFP or a printer that executes the printing service can temporarily store an aggregated image. When a difference between workflows is due to only a difference in the number of printing sheets, because the aggregated image is not changed, it is possible to use data of the aggregated image being an intermediate result that is temporarily stored. By using the intermediate result as above, it is possible to further reduce process time and save usage cost.

For example, let us suppose that there are a workflow I consisting of the scanning service and the printing service to be executed in this order and a workflow J consisting of the scanning service and the printing service to be executed in this order similarly to the workflow I while the printing service of the workflow J is different from the printing service of the workflow I in terms of the number of printing sheets. Let us also suppose that the workflow I is first executed and thereafter the workflow J is executed.

When the workflow I is executed, an image on a paper document is read and the read image is stored in the workflow information in association with a process result ID of an intermediate process that is stored during execution of the printing service being the storing object. When the workflow J is to be executed, an image read at this time is compared with the image that has been stored. When the images match each other, the intermediate result is acquired by using the associated process result ID and is transmitted to an apparatus that executes the printing service so that the printing service can be executed from a process in the middle of the service.

The present invention is explained by the above embodiments of the workflow management system, the information processing apparatus, and the workflow execution method. However, the present invention is not limited to the above embodiments. The present invention may be modified into other embodiments by any addition, change, or deletion within a range that a person skilled in the art can think of. Any embodiments that achieve the advantageous effects of the present invention are considered as being within the scope of the present invention. Therefore, the present invention may be applied not only to the information processing apparatus, the workflow management system, and the workflow execution method as described above but also to a computer-readable program for implementing the workflow execution method and a recording medium storing the program.

With the above configuration, it is possible to omit a process of a service and save usage cost for a workflow when the same workflow is repeatedly used on the same input document.

The workflow control unit 31 receives document identification information for identifying an input document; determines whether the received document identification information matches document identification information included in workflow information. When it is determined that the information is identical and the workflow information further includes result identification information, the result acquiring unit 33 acquires a process result from the result storage unit 34. When the information is not identical, because the workflow is executed on the input document for the first time, an intermediate result is not present. Therefore, the workflow is executed from the first process. Once the workflow is executed, a process result is stored as an intermediate result and result identification information of the intermediate result is recorded in the workflow information. Therefore, when the result identification information is not included in the workflow information, it is determined that the workflow is executed for the first time and the workflow is executed from the first process similarly to the above.

The information processing apparatus further includes a storing-object determining unit 38 that determines, as a process result of a storing object, a process result of a process that is identified by process identification information immediately preceding process identification information that has been determined as different information by comparison between each process identification information performed by a process determining unit that compares pieces of process identification information in order of execution. In this case, the workflow control unit 31 assigns result identification information to the process result, stores the process result and the result identification information in the result storage unit 34 in an associated manner, and stores the result identification information in a workflow-information storage unit 32 in association with a corresponding process in the registered workflow information and in the workflow information to be registered. Consequently, it becomes possible to handle the processes preceding the stored process as executed processes and execute only remaining processes by using the process result of the stored process as an input to a subsequent process.

The storing-object determining unit 38 may determine a process result of a storing object on the basis of usage charge or process time needed for execution of a process. For example, when usage charge for a certain service is free, it is not needed to store a process result of the process. In this case, it is possible to store a process result only of a process to be charged. Consequently, it becomes possible to reduce the number of process results to be stored and prevent memory shortage.

When the first process of a workflow is an image read process, the workflow control unit 31 assigns result identification information to image data of read image, stores the image data and the result identification information in the result storage unit 34 in an associated manner, and stores the result identification information in the workflow-information storage unit 32 in association with result identification information of a process result of the storing object of the workflow information. Accordingly, it becomes possible to compare a read image with the stored image, omit common processes when the images match each other, acquire a process result of the storing object as an intermediate result, and perform a subsequent process by using the process result.

While the images are compared with each other in the above example, when images include marking information, it is possible to compare the marking information.

When an apparatus that executes a process has a function of storing an intermediate result during the process, the storing-object determining unit 38 determines the intermediate result as a process result of a storing object. For example, when a printing device stores, as an intermediate result, an aggregated image used for performing aggregate printing in a printing process, the storing-object determining unit 38 determines the image data of the aggregate image as a process result and stores the image data in the result storage unit 34. Therefore, it becomes possible to start execution of the printing process in the middle of the printing process instead of starting execution of the printing process from the first step. Consequently, it is possible to reduce process time.

It is possible to provide a workflow execution method performed by the above information processing apparatus, a computer-readable program for implementing the method, and a recording medium recording the program.

With the apparatus, the system, the method, and the program as above, it is possible to omit a process of a service and save usage cost for a workflow when the same workflow is repeatedly used on the same input document. Furthermore, process results of services are stored when a workflow is executed, and when the workflow is repeated, the workflow is executed from a process in the middle of the workflow by using the stored process result. In this case, if the process results of all processes are stored, the amount of process results to be stored increases, leading to memory shortage.

However, according to the apparatus, the system, the method, and the program of the present invention, only a needed process result is stored, so that it is possible to prevent memory shortage.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus to sequentially execute one or more processes of a workflow on an input document, the information processing apparatus comprising:
a workflow-information storage unit to store workflow information;
a result storage unit to store a process result;
a workflow control unit to receive workflow identification information for identifying the workflow and to acquire workflow information from the workflow-information storage unit on the basis of the workflow identification information, the workflow information including process identification information to identify each of the processes to be executed and an order of execution of the processes, and the workflow information further including result identification information to identify a process result of any of the processes when the process result is stored in the result storage unit; and
a result acquiring unit, stored in a tangible memory of the information processing apparatus, to acquire the process result from the result storage unit on the basis of the result identification information when the workflow information acquired by the workflow control unit includes the result identification information, wherein
the workflow control unit acquires the process result from the result acquiring unit and transmits the process result to an apparatus to execute a process subsequent to a process corresponding to the process result in the workflow in order to execute the workflow from a process in a middle of the workflow.

2. The information processing apparatus according to claim 1, wherein
when the workflow information does not include the result identification information, the workflow control unit transmits the input document to an apparatus that executes a first process of the workflow so that all of the processes in the workflow are executed in the order of execution.

3. The information processing apparatus according to claim 2, wherein
the workflow control unit is further to transmit a process result acquired from the apparatus to execute the first process to an apparatus to execute a subsequent process, to store the process result in the result storage unit after assigning result identification information to the process result, and to store the result identification information in the workflow-information storage unit after associating the result identification information with the process identification information included in the workflow information.

4. The information processing apparatus according to claim 1, wherein
the workflow control unit is further to receive first document identification information for identifying the input document, to determine whether the first document identification information matches second document identification information included in the workflow information, and when the first document identification information and the second document identification information match each other and when the workflow information includes the result identification information, the result acquiring unit acquires the process result from the result storage unit.

5. The information processing apparatus according to claim 1, further comprising a process determining unit, stored in a memory of the information processing apparatus, to determine whether any workflow information has been registered in the workflow-information storage unit when the workflow control unit receives, as workflow information to be registered, workflow information including the process identification information of each of the processes to be executed and the order of execution of the processes, and, when determining that there is registered workflow information in the workflow-information storage unit, to compare each process identification information included in the registered workflow information with each process identification information included in the workflow information to be registered, in the order of execution, to thereby determine whether there is at least one different process identification information between the pieces of the workflow information.

6. The information processing apparatus according to claim 5, further comprising a storing-object determining unit, stored in a memory of the information processing apparatus, to determine, as a process result of a storing object, a process result of a process that is identified by process identification information preceding process identification information that has been determined as different identification by comparison between each process identification information performed by the process determining unit in order of execution.

7. The information processing apparatus according to claim 6, wherein
the storing-object determining unit determines, as the process result of the storing object, a process result of a process identified by the process identification information prior to the process identification information that is determined as different information by comparison between each process identification information included in each of a plurality of pieces of the registered workflow information and each process identification information included in the workflow information to be registered in the order of execution.

8. The information processing apparatus according to claim 6, wherein
the storing-object determining unit determines the process result of the storing object on the basis of usage charge or process time needed to execute the processes.

9. The information processing apparatus according to claim 6, wherein
the storing-object determining unit determines, as the process result of the storing object, an intermediate result when an apparatus that executes a process has a function of storing the intermediate result during the processes.

10. The information processing apparatus according to claim 1, wherein
when the first process of the workflow is an image read process, the workflow control unit assigns result identification information of the process result of the storing object of the workflow information to image data of a read image, and stores the image data and the result identification information in the result storage unit in an associated manner.

11. The information processing apparatus according to claim 1, wherein
when the first process of the workflow is an image read process and when an image to be read includes marking information, the workflow control unit assigns result identification information of the process result of the storing object of the workflow information to the read marking information, and stores the marking information and the result identification information in the result storage unit in an associated manner.

12. The information processing apparatus according to claim 1, wherein
when the workflow information stored in the workflow-information storage unit is deleted or updated, the workflow control unit deletes the process result of the storing objet that has been stored in the result storage unit in association with the workflow information being deleted or updated.

13. A workflow management system comprising:
an information processing apparatus to sequentially execute one or more processes of a workflow on an input document, the information processing apparatus including:
a workflow-information storage unit to store workflow information;
a result storage unit to store a process result;
a workflow control unit to receive workflow identification information for identifying the workflow and to acquire workflow information from the workflow-information storage unit on the basis of the workflow identification information, the workflow information including process identification information to identify each of the processes to be executed and an order of execution of the processes, and the workflow information further including result identification information to identify a process result of any of the processes when the process result is stored in the result storage unit; and
a result acquiring unit, stored in a tangible memory of the information processing apparatus, to acquire the process result from the result storage unit on the basis of the result identification information when the workflow information acquired by the workflow control unit includes the result identification information, wherein
the workflow control unit acquires the process result from the result acquiring unit and transmits the process result to an apparatus to execute a process subsequent to a process corresponding to the process result in the workflow in order to execute the workflow from a process in the middle of the workflow; and
apparatuses to execute the respective processes.

14. A workflow execution method for sequentially executing one or more processes on an input document, the workflow execution method comprising:
receiving workflow identification information for identifying the workflow;
acquiring workflow information from a workflow-information storage unit on the basis of the workflow identification information, the workflow information including process identification information for identifying each of the processes to be executed and an order of execution of the processes, and the workflow information further including result identification information for identifying a process result of any of the processes when the process result is stored in a result storage unit;

acquiring the process result from a result storage unit on the basis of the result identification information when the workflow information acquired by a workflow control unit includes the result identification information;

transmitting the process result to an apparatus that executes a process subsequent to a process corresponding to the process result in the workflow, wherein the workflow is executed from a process in the middle of the workflow.

15. The workflow execution method according to claim 14, further comprising:

transmitting, when the workflow information acquired at the acquiring workflow information does not include the result identification information, the input document to an apparatus that executes a first process so that all of the processes in the workflow are executed in the order of execution.

16. The workflow execution method according to claim 15, further comprising:

transmitting a process result acquired from the apparatus that has executed the first process to an apparatus that is to execute a subsequent process;

assigning result identification information to the process result;

storing the process result in association with the result identification information in the result storage unit;

storing the result identification information in the workflow-information storage unit in association with the process identification information in the workflow information.

17. The workflow execution method according to claim 14, further comprising:

receiving first document identification information for identifying the input document;

determining whether or not the first document identification information matches second document identification information included in the workflow information;

acquiring the process result from the result storage unit when the first document identification information and the second document identification information match each other and the workflow information includes the result identification information.

18. The workflow execution method according to claim 14, further comprising:

determining whether or not any workflow information has been registered in the workflow-information storage unit when workflow information including the process identification information of each of the processes to be executed and the order of execution of the processes is received as workflow information to be registered; and comparing, when it is determined that there is registered workflow information at the determining, each process identification information included in the registered workflow information with each process identification information included in the workflow information to be registered, in the order of execution, thereby determining whether there is at least one different process identification information between the pieces of the workflow information.

19. The workflow execution method according to claim 14, further comprising:

assigning, when the first process of the workflow is an image read process, result identification information of a process result of a storing object of the workflow information to image data of a read image; and storing the image data and the result identification information in the result storage unit in an associated manner.

20. The workflow execution method according to claim 14, further comprising:

deleting, when the workflow information stored in the workflow-information storage unit is deleted or updated, the process result of the storing object that has been stored in the result storage unit in association with the workflow information being deleted or updated.

* * * * *